(12) United States Patent
Takeuchi et al.

(10) Patent No.: US 7,307,383 B2
(45) Date of Patent: Dec. 11, 2007

(54) ELECTRON EMITTER AND METHOD OF PRODUCING THE SAME

(75) Inventors: Yukihisa Takeuchi, Nishikamo-Gun (JP); Tsutomu Nanataki, Toyoake (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 263 days.

(21) Appl. No.: 10/952,524

(22) Filed: Sep. 28, 2004

(65) Prior Publication Data

US 2005/0073261 A1   Apr. 7, 2005

(30) Foreign Application Priority Data

Oct. 3, 2003   (JP) .............................. 2003-346091

(51) Int. Cl.
*G01G 3/10* (2006.01)
*H01J 29/70* (2006.01)

(52) U.S. Cl. .................................. 315/169.1; 313/495

(58) Field of Classification Search ............ 315/169.1, 315/169.2, 169.3, 169.4; 313/495, 497, 631, 313/633, 491, 493, 619, 621
See application file for complete search history.

(56) References Cited

U.S. PATENT DOCUMENTS

| | | | |
|---|---|---|---|
| 5,280,221 A | 1/1994 | Okamoto et al. | |
| 5,453,661 A | 9/1995 | Auciello et al. | |
| 5,508,590 A | 4/1996 | Sampayan et al. | |
| 5,631,664 A | 5/1997 | Adachi et al. ................. | 345/74 |
| 5,666,019 A | 9/1997 | Potter | |
| 5,726,524 A | 3/1998 | Debe | |
| 5,729,094 A | 3/1998 | Geis et al. | |
| 5,747,926 A | 5/1998 | Nakamoto et al. | |
| 5,874,802 A | 2/1999 | Choi et al. | |
| 5,877,594 A | 3/1999 | Miyano et al. | |
| 5,990,605 A | 11/1999 | Yoshikawa et al. | |
| 6,040,973 A | 3/2000 | Okamoto et al. | |
| 6,153,978 A | 11/2000 | Okamoto | |
| 6,157,145 A | 12/2000 | Vollkommer et al. | |
| 6,184,612 B1 | 2/2001 | Negishi et al. | |
| 6,198,225 B1* | 3/2001 | Kano et al. ............... | 315/169.3 |

(Continued)

FOREIGN PATENT DOCUMENTS

DE     3833604     4/1990

(Continued)

OTHER PUBLICATIONS

U.S. Appl. No. 10/730,754, filed Dec. 8, 2003, Takeuchi et al.

(Continued)

*Primary Examiner*—Shih-Chao Chen
*Assistant Examiner*—Minh Dieu A
(74) *Attorney, Agent, or Firm*—Burr & Brown

(57) ABSTRACT

An electron emitter includes an emitter section having a plate shape, a cathode electrode formed on a front surface of the emitter section, and an anode electrode formed on a back surface of the emitter section. A gap is formed between an outer peripheral portion of the cathode electrode and the front surface of the emitter section. The front surface of the emitter section contacts a lower surface of the outer peripheral portion to form a base end as a triple junction. The gap expands from the base end toward a tip end of the outer peripheral portion.

30 Claims, 31 Drawing Sheets

U.S. PATENT DOCUMENTS

| | | | |
|---|---|---|---|
| 6,274,881 B1 | 8/2001 | Akiyama et al. | |
| 6,285,123 B1 | 9/2001 | Yamada et al. | |
| 6,313,815 B1 | 11/2001 | Takeda et al. | |
| 6,323,594 B1 * | 11/2001 | Janning | 313/495 |
| 6,359,383 B1 | 3/2002 | Chuang et al. | |
| 6,379,572 B1 * | 4/2002 | Kikuchi et al. | 216/42 |
| 6,441,542 B1 * | 8/2002 | Hush et al. | 313/309 |
| 6,452,328 B1 | 9/2002 | Saito et al. | |
| 6,469,452 B2 | 10/2002 | Seo et al. | |
| 6,479,924 B1 | 11/2002 | Yoo | |
| 6,530,814 B1 * | 3/2003 | Browning et al. | 445/59 |
| 6,580,108 B1 | 6/2003 | Utsumi et al. | |
| 6,882,100 B2 | 4/2005 | Chen et al. | 313/498 |
| 6,911,768 B2 | 6/2005 | Chen et al. | 313/391 |
| 2002/0060516 A1 * | 5/2002 | Kawate et al. | 313/495 |
| 2002/0153827 A1 | 10/2002 | Takeuchi et al. | |
| 2004/0061431 A1 | 4/2004 | Takeuchi et al. | |
| 2004/0066133 A1 | 4/2004 | Takeuchi et al. | |
| 2004/0090398 A1 | 5/2004 | Takeuchi et al. | |
| 2004/0100200 A1 | 5/2004 | Takeuchi et al. | |
| 2004/0104684 A1 | 6/2004 | Takeuchi et al. | |
| 2004/0104689 A1 | 6/2004 | Takeuchi et al. | |
| 2004/0104690 A1 | 6/2004 | Takeuchi et al. | |
| 2004/0113561 A1 | 6/2004 | Takeuchi et al. | |

FOREIGN PATENT DOCUMENTS

| | | |
|---|---|---|
| DE | 10057072 | 5/2001 |
| EP | 0 353 632 | 2/1990 |
| EP | 428853 | 5/1991 |
| EP | 0 953 958 A2 | 11/1999 |
| FR | 2639151 | 5/1990 |
| FR | 2675306 | 10/1992 |
| FR | 2789221 | 8/2000 |
| FR | 2789223 | 8/2000 |
| JP | 44-26125 | 11/1969 |
| JP | 46-20944 | 6/1971 |
| JP | 59-208587 | 11/1984 |
| JP | 1-311533 A | 12/1989 |
| JP | 05-325777 A1 | 12/1993 |
| JP | 06-103886 | 4/1994 |
| JP | 7-147131 A | 6/1995 |
| JP | 08-111166 A1 | 4/1996 |
| JP | 09-090882 A | 4/1997 |
| JP | 10-27539 A | 1/1998 |
| JP | 63-150837 A | 6/1998 |
| JP | 10-241553 | 9/1998 |
| JP | 11-185600 | 7/1999 |
| JP | 11-288249 A | 10/1999 |
| JP | 2000-285801 A | 10/2000 |
| JP | 2000-310970 A | 11/2000 |
| JP | 3160213 B2 | 2/2001 |
| JP | 3214256 B2 | 7/2001 |
| WO | 02/052600 A1 | 7/2002 |

OTHER PUBLICATIONS

U.S. Appl. No. 10/951,509, filed Sep. 28, 2004, Takeuchi et al.
U.S. Appl. No. 10/950,976, filed Sep. 27, 2004, Takeuchi et al.
U.S. Appl. No. 10/951,832, filed Sep. 28, 2004, Takeuchi et al.
U.S. Appl. No. 10/459,415, filed Jun. 11, 2003, Takeuchi et al.
U.S. Appl. No. 10/647,794, filed Aug. 25, 2003, Takeuchi et al.
U.S. Appl. No. 10/719,521, filed Nov. 21, 2003, Takeuchi et al.
U.S. Appl. No. 10/731,901, filed Dec. 9, 2003, Takeuchi et al.
U.S. Appl. No. 10/808,258, filed Mar. 24, 2004, Takeuchi et al.
U.S. Appl. No. 10/901,932, filed Jul. 29, 2004, Takeuchi et al.
U.S. Appl. No. 10/919,678, filed Aug. 17, 2004, Takeuchi et al.
U.S. Appl. No. 10/919,747, filed Aug. 17, 2004, Takeuchi et al.
"Pulsed Electron Source Using a Ferroelectric Cathode," Tokyo Institute of Technology, vol. 68, No. 5, Jan. 7, 1999, pp. 546-550.
Puchkarev, Victor F. and Mesyats, Gennady A., "On the Mechanism of Emission from the Ferroelectric Ceramic Cathode," Journal of Applied Physics, vol. 78, No. 9, Nov. 1, 1995, pp. 5633-5637.
Riege, H., "Electron Emission from Ferroelectrics—a Review," Nucl. Instr. and Meth. A340, 1994, pp. 80-89.
Masatoshi Miyake et al., "Electron Emission from Ferroelectric Cathodes Excited by Pulsed Voltage," Tokyo Institute of Technology, vol. 119, No. 5, 1999 pp. 622-627.
G. Benedek et al., "Electron Emission From Ferroelectric/Antiferroelectric Cathodes Excited by Short High-Voltage Pulses," Journal Applied Physics, vol. 81, No. 3, Feb. 1, 1997, pp. 1396-1403.
Gundel, H. et al., "Low Pressure Hollow Cathode Switch Triggered by a Pulsed Electron Beam Emitted From Ferroelectrics," Applied Physics Letter, American Institute of Physics, New York, US vol. 54, No. 21, May 22, 1989, pp. 2071-2073.
Gundel, H. et al., "Time-Dependent Electron Emission From Ferroelectrics by External Pulsed Electric Fields," Journal of Applied Physics, American Institute of Physics, New York, US vol. 69, No. 2, Jan. 15, 1991, pp. 975-982.
Kanemaru, Seigou, "Featuring: All About Flat Displays 2000, Leading Technological Trend of FEDs," Electronic Engineering, Nikkan Kogyo Shimbun, Ltd., Jul. 2000, pp. 38-41 (with partial translation).

* cited by examiner

ELECTRON EMITTER AND METHOD OF PRODUCING THE SAME

This application claims the benefit of Japanese Application 2003-346091, filed Oct. 3, 2003, the entirety of which is incorporated herein by reference.

BACKGROUND OF THE INVENTION

1. Field of the Invention

The present invention relates to an electron emitter including a first electrode and a second electrode formed on a substance serving as an emitter. Further, the present invention relates to a method of producing the electron emitter.

2. Description of the Related Art

In recent years, electron emitters having a cathode electrode and an anode electrode have been used in applications such as field emission displays (FEDs) and backlight units. In an FED, a plurality of electron emitters are arranged in a two-dimensional array, and a plurality of phosphors are positioned at predetermined intervals in association with the respective electron emitters.

Conventional electron emitters are disclosed in Japanese laid-open patent publication No. 1-311533, Japanese laid-open patent publication No. 7-147131, Japanese laid-open patent publication No. 2000-285801, Japanese patent publication No. 46-20944, and Japanese patent publication No. 44-26125, for example. All of these disclosed electron emitters are disadvantageous in that since no dielectric material is employed in the emitter section, a forming process or a micromachining process is required between facing electrodes, a high voltage needs to be applied between the electrodes to emit electrons, and a panel fabrication process is complex and entails a high production cost.

It has been considered to make an emitter section of a dielectric material. Various theories about the emission of electrons from a dielectric material have been presented in the documents: Yasuoka and Ishii, "Pulsed Electron Source Using a Ferroelectric Cathode", OYO BUTURI (A monthly publication of The Japan Society of Applied Physics), Vol. 68, No. 5, pp. 546-550 (1999), V. F. Puchkarev, G. A. Mesyats, "On the Mechanism of Emission from the Ferroelectric Ceramic Cathode", J. Appl. Phys., Vol. 78, No. 9, 1 Nov. 1995, pp. 5633-5637, and H. Riege, "Electron Emission from Ferroelectrics—A Review", Nucl. Instr. and Meth. A340, pp. 80-89 (1994).

In the conventional electron emitters, electrons trapped on the surface of the dielectric material, at the interface between the dielectric material and the upper electrode, and in the dielectric material by the defect level are released (emitted) when polarization reversal occurs in the dielectric material. The number of the electrons emitted by the polarization reversal does not change substantially depending on the voltage level of the applied voltage pulse.

However, in the conventional electron emitters, the electron emission is not performed stably, and the number of emitted electrons is merely tens of thousands. Therefore, conventional electron emitters are not suitable for practical use. Advantages of an electron emitter having an emitter section made of a dielectric material have not been achieved.

SUMMARY OF THE INVENTION

The present invention has been made taking the circumstances into account, and an object of the present invention is to provide an electron emitter having first and second electrodes on a surface of a substance comprising a dielectric material serving as an emitter, and provide a method of producing the electron emitter, in which a drive voltage is applied between the first electrode and the second electrode for emitting electrons from the substance serving as the emitter, and the drive voltage used for electron emission is low in comparison with the case of the conventional electron emitter.

According to an aspect of the present invention, an electron emitter includes a substance comprising a dielectric material serving as an emitter, a first electrode formed in contact with a first surface of the substance serving as the emitter, and a second electrode formed in contact with a second surface of the substance serving as the emitter. A gap is formed at least between an outer peripheral portion of the first electrode and the first surface of the substance serving as the emitter. A base end is formed by contact between the first surface of the substance serving as the emitter and a lower surface of the outer peripheral portion facing the first surface. When a drive voltage for inducing polarization reversal of the substance serving as the emitter is applied between the first electrode and the second electrode, electric field concentration occurs at a tip end of the outer peripheral portion and the base end for emitting electrons.

In the electron emitter, a triple junction is formed in a region of contact between the first surface of the substance serving as the emitter, the first electrode, and a medium (e.g., vacuum) around the electron emitter. Further, another triple junction is formed in a region of contact between the second surface of the substance serving as the emitter, the second electrode, and the medium around the electron emitter. Therefore, when the drive voltage is applied between the first electrode and the second electrode, electric field concentration occurs at the triple junctions.

The triple junction is defined as an electric field concentration region formed by the contact between the first or second electrode, the substance serving as the emitter, and the vacuum. The triple junction includes a triple point where the first electrode, the substance serving as the emitter, and the vacuum exist as one point.

For example, the drive voltage is defined as a voltage, such as a pulse voltage or an alternating-current voltage, which abruptly changes its polarity with time.

When the drive voltage is applied, polarization occurs in the substance serving as the emitter based on the electric field distribution between the first electrode and the second electrode. In particular, in the substance serving as the emitter, large polarization occurs in a region near the triple junction as the electric field concentration region.

When polarization occurs, if the polarity of the drive voltage is reversed, in the substance serving as the emitter near the triple junction, large polarization reversal occurs. Therefore, electrons are emitted from at least the first electrode. Some of the electrons emitted from the first electrode impinge upon a surface of the substance serving as the emitter. The impinged electrons are reflected by the surface, or induce emission of secondary electrons from the surface. Otherwise, some of the emitted electrons do not impinge upon the substance serving as the emitter, and are discharged to the outside of the electron emitter. Thus, the electrons are emitted from the electron emitter.

In this case, if the polarization in the substance serving as the emitter is large, large polarization reversal occurs when the polarity of the drive voltage is reversed. Thus, the number of electrons emitted from the first or second electrode is large, and the number of electrons emitted from the substance serving as the emitter is large. That is, by simply providing the triple junction, it is possible to improve the electron emission efficiency of the electron emitter.

In the electron emitter according to the present invention, the triple junctions are formed at (1) the contact point between the outer peripheral portion of the first electrode, the first surface of the substance serving as the emitter, and the vacuum, (2) the contact point between the outer peripheral portion of the second electrode, the second surface of the substance serving as the emitter, and the vacuum, respectively.

Therefore, large polarization reversal occurs in the region near the base end. Further, polarization reversal also occurs near the tip end of the outer peripheral portion. Thus, electrons are emitted from the surface of the first electrode in an area extending from the region near the triple junction to the region near the tip end of the peripheral portion, and electrons are also emitted from the first surface of the substance serving as the emitter in an area extending from the region near the base end to the region near (facing) the tip end of the outer peripheral portion.

As described above, in the electron emitter, by providing the gap, it is possible increase the electron emission area of the first surface of the substance serving as the emitter. Thus, electron emission efficiency of the electron emitter is improved.

Further, since the electron emission area is increased by peeling the outer peripheral portion, simply by increasing the distance of the outer peripheral portion, it is possible to improve the electron emission efficiency. Therefore, it is preferable to use an electrode having a complicated outer shape such as a ring shape or a comb shape. Most part of the first electrode other than the outer peripheral portion functions to achieve the close contact with the substance serving as the emitter.

Further, if the tip end of the outer peripheral portion has an acute shape, the electric field concentration occurs further intensely at the tip end. Therefore, very large polarization and polarization reversal can be achieved.

Further, it is preferable that an angle formed by the contact between the first surface of the substance serving as the emitter and the lower surface of the outer peripheral portion is not greater than 90°.

According to another aspect of the present invention, an electron emitter includes a substance comprising a dielectric material serving as an emitter, a first electrode formed in contact with a first surface of the substance serving as the emitter, a second electrode formed in contact with a second surface of the substance serving as the emitter. When the first electrode is projected on the first surface, the second electrode is projected on the second surface, and a projection image of the first electrode and a projection image of the second electrode are compared with each other, the projection image of the second electrode protrudes from the projection image of the first electrode.

In the electron emitter, large polarization and polarization reversal can be achieved in the substance serving as the emitter in the region corresponding to the projection image of the second electrode protruding from the projection image of the first electrode. Thus, it is possible to improve the electron emission efficiency.

In the electron emitter, preferably, an outer peripheral portion of the projection image of the second electrode protrudes from a tip end of an outer peripheral portion of the projection image of the first electrode by 1 to 500 µm at most. If the protrusion is less than 1 µm, since the area which can achieve large polarization is small, the electron emission efficiency is decreased. If the protrusion is more than 500 µm, since the number of exposed regions is increased excessively in the substance serving as the emitter, large polarization may not be achieved in some of the regions even if electric field concentration occurs in the triple junction. Therefore, the electron emission efficiency is decreased.

In all of the above electron emitters, it is preferable that at least the first electrode comprises cermet. In this case, it is preferable that cermet includes gold, platinum, or silver, and a piezoelectro/electrostrictive material. Preferably, the piezoelectro/electrostrictive material has a proportion ranging from 10 to 40 volume %. If the proportion is less than 10 volume %, the first electrode is not suitably in close contact with the substance serving as the emitter. Therefore, the first electrode may be peeled off from the substance serving as the emitter. If the proportion is more than 40 volume %, gold, platinum, or silver may be separated from the first electrode undesirably.

Further, in order to reduce the fatigue due to polarization reversal of the substance serving as the emitter which occurs when the drive voltage is applied between the first electrode and the second electrode, preferably, at least the first electrode comprises metal oxide. For example, the metal oxide includes $RuO_2$, $IrO_2$, $SrRuO_3$, or $La_{1-x}Sr_xCoO_3$.

Preferably, the substance serving as the emitter comprises a dielectric material having a high melting point. In this case, preferably, the dielectric material is a material which does not include Pb such as $BaTiO_3$ or $Ba_{1-x}Sr_xTiO_3$.

Further, preferably, the substance serving as the emitter comprises a material for reducing fatigue due to polarization reversal of the substance serving as the emitter which occurs when the drive voltage is applied between the first electrode and the second electrode. For example, the material for reducing fatigue due to polarization reversal includes strontium tantalate bismuthate.

Further, the electron emitter may be formed on a substrate. In this case, a plurality of the second electrodes are formed on an upper surface of the substrate, a plurality of the substances serving as the emitters are formed on the upper surface of the substrate to cover the second electrodes, a plurality of the first electrodes are formed on upper surfaces of the substances serving as the emitters at positions corresponding to the second electrodes, respectively, and slits are formed between the substances serving as the emitters such that the upper surface of the substrate is exposed.

Further, in another embodiment of the electron emitter formed on the substrate, a plurality of dielectric substances are formed on an upper surface of the substrate, a plurality of the second electrodes are formed on upper surfaces of the dielectric substances, respectively, a plurality of the substances serving as the emitters are formed on upper surfaces of the second electrodes and upper surfaces of the dielectric substances, a plurality of the first electrodes are formed on upper surfaces of the substances serving as the emitters at positions corresponding to the second electrodes, respectively, wiring patterns are formed on the upper surface of the substrate, and portions of the second electrodes are connected to the wiring patterns.

In the electron emitter, a third electrode may be formed above the substance at a position facing at least the first electrode, and a phosphor may be formed on a surface of the third electrode. In this case, the electrons emitted from the substance serving as the emitter impinges upon the phosphor to excite the phosphor for light emission. Thus, for example, the electron emitter according to the present invention is utilized as an electron emission source of a display.

According to the present invention, a method of producing an electron emitter includes the steps of forming an upper electrode in contact with an upper surface of a substance comprising a dielectric material serving as an emitter, forming a lower electrode in contact with a lower surface of the substance serving as the emitter, and applying a high voltage between the upper electrode and the lower electrode to form a gap at least between an outer peripheral portion of the upper electrode and the upper surface of the substance serving as the emitter.

The high voltage herein means a voltage which causes reversal of polarity such as alternating polarity or pulse polarity. Application of the high voltage causes very large electron emission between the outer peripheral portion of the upper electrode and the substance serving as the emitter. In the region where the large electron emission occurs, a plaza may be generated. By the electron emission, the outer peripheral portion of the upper electrode is melted, and rolls up from the surface of the substance serving as the emitter. That is, the rolled outer peripheral portion is peeled off from the surface of the substance serving as the emitter. Thus, the gap is formed between the outer peripheral portion and the surface of the substance serving as the emitter. The high voltage includes the drive voltage applied between the upper electrode and the lower electrode for electron emission.

Since the gap is provided, in addition to the part of the substance serving as the emitter which is not covered by the upper electrode, the part of the substance serving as the emitter forming the gap is also utilized as the region for emitting electrons. When the drive voltage is applied between the first electrode and the second electrode, the electric field concentration occurs at the tip end of the outer peripheral portion and the base end. Therefore, large polarization and polarization reversal occurs in the substance serving as the emitter. Thus, the electrons are emitted from the first electrode easily, and it is possible to provide the electron emitter having the high electron emission efficiency.

Further, it is preferable that the tip end of the outer peripheral portion is formed to have an acute shape at the time of providing the gap, since the electric field concentration occurs further intensely at the tip end, and the electrons are easily emitted from the tip end at the time of polarization reversal.

The electron emitter production method may further include the steps of forming another electrode above the substance serving as the emitter at least at a position facing the upper electrode, forming a phosphor on a surface of the other electrode, and applying the high voltage between the upper electrode and the lower electrode and applying another voltage to the other electrode for inducing emission of electrons at least from the upper surface of the substance serving as the emitter such that the emitted electrons impinge upon the phosphor for exciting the phosphor to emit light. The luminance of light emitted from the phosphor may be measured to determine completeness of the gap.

The other voltage herein means a voltage for accelerating the emitted electrons such that the electrons impinge upon the phosphor. For example, the other voltage includes a collector voltage used for acceleration of electrons.

In the production method, the luminance of the phosphor depends on the number of electrons emitted from the emitter in the region (electron emission region) facing (near) the gap of the electron emitter, or the electron emission efficiency of the electron emitter. That is, by measuring the luminance of the phosphor, it is possible to check the electron emission efficiency of the electron emitter. Therefore, it is not necessary to directly check the region around the gap to determine the completeness of the gap. The gap is formed simply by adjusting the voltage supplied to the cathode electrode while measuring the luminance of the phosphor. In this manner, the electron emitter having the desired electron emission efficiency is obtained.

Further, in the electron emitter production method, one of the following processes is used, or a plurality of the following processes are used in combination to form the gap. (1) A high voltage is applied from a power source through a resistor, and a resistance value of the resistor is reduced to form the gap. (2) A voltage value of the high voltage is increased to form the gap. (3) A frequency of the high voltage is increased to form the gap.

Further, the above-described electron emitter production method is applicable, e.g., in a case in which the electron emitter is used as an electron emission source of a display. In this application, at the final inspection process before shipping from the factory, the operator of the final inspection applies the high voltage between the first electrode and the second electrode to form the gap while checking the luminance of the phosphor to achieve the desired luminance by adjustment. Thus, it is possible to ship the display having the desired luminance.

In another application, when the luminance of the display is deteriorated while the display is used over a long period of time, the operator may use the electron emitter production method in a maintenance operation for increasing the luminance of the display.

A device having functions of the electron emitter production method may be incorporated in the display in advance. In this case, the user of the display can uses the device for adjusting the luminance of the display at the desirable level.

Further, according to another aspect of the present invention, a method of producing an electron emitter includes the steps of forming a plurality of lower electrodes on an upper surface of a substrate, forming a dielectric substance on the upper surface of the substrate to cover the lower electrodes, forming a plurality of upper electrodes on an upper surface of the dielectric substance at positions corresponding to the lower electrodes, respectively, and removing part of the dielectric substance which is not interposed between the upper electrodes and the lower electrodes such that the remaining portions of the dielectric substance which are interposed between the upper electrodes and the lower electrodes are formed as substances serving as emitters.

According to the present invention, a method of producing a device including a plurality of electron emitters includes the steps of forming a plurality of dielectric substances on an upper surface of a substrate, and forming the electron emitters on dielectric substances, respectively. The electron emitters include substances comprising a dielectric material serving as emitters, upper electrodes formed on upper surfaces of the substances serving as the emitters, and lower electrodes formed on lower surfaces of the substances serving as the emitters. Lower surfaces of the lower electrodes are in contact with the upper surfaces of the dielectric substances. Further, the method further includes the step of forming wiring patterns on the upper surface of the substrate, and thereafter, connecting the lower electrodes and the wiring patterns.

In the electron emitter according to the present invention, a gap is formed between an outer peripheral portion of a first electrode and an upper surface of a substance serving as an emitter. Therefore, when a drive voltage is applied between the first electrode and the second electrode, large electric field concentration occurs at a base end and a tip end of the outer peripheral portion. Thus, in the substance serving as the emitter, large polarization and polarization reversal occurs near the base end. Further, the polarization reversal occurs in the substance serving as the emitter in the region facing the tip end of the outer peripheral portion. Therefore, even if the drive voltage is a low voltage, electrons are emitted from the substance serving as the emitter.

Further, in the electron emitter production method according to the present invention, the electron emitter is produced such that a gap is formed between an outer peripheral portion of a first electrode and an upper surface of a substance serving as an emitter. Therefore, when a drive voltage is applied between the first electrode and the second electrode, large electric field concentration occurs at a base end and a tip end of the outer peripheral portion. Thus, in the substance serving as the emitter, large polarization and polarization reversal occurs near the base end. Further, the polarization reversal occurs in the substance serving as the emitter in the region facing the tip end of the outer peripheral portion. Therefore, even if the drive voltage is a low voltage, electrons are emitted from the substance serving as the emitter.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, electron emitters and methods of producing the electron emitters according to embodiments of the present invention will be described below with reference to FIGS. 1 through 31.

Electron emitters according to the embodiments of the present invention can be used in electron beam irradiation apparatus, light sources, alternatives to LEDs, electronic parts manufacturing apparatus, and electronic circuit components, as well as display applications.

An electron beam in an electron beam irradiation apparatus has a high energy and a good absorption capability in comparison with ultraviolet rays in ultraviolet ray irradiation apparatus that are presently in widespread use. The electron emitters may be used to solidify insulating films in superposing wafers for semiconductor devices, harden printing inks without irregularities for drying prints, and sterilize medical devices while being kept in packages.

The electron emitters may also be used as high-luminance, high-efficiency light sources for use in projectors, for example, which may employ ultrahigh-pressure mercury lamps. The light sources using the electron emitters according to the embodiments of the present invention are compact, have a long service life, and have a high-speed turn-on capability. The light sources do not use any mercury, and are environmentally friendly.

The electron emitters may also be used as alternatives to LEDs, such as surface light sources for indoor lights, automobile lamps, surface light sources for traffic signal devices, chip light sources, and backlight units for traffic signal devices, small-size liquid-crystal display devices for cellular phones.

The electron emitters may also be used in electronic parts manufacturing apparatus as electron beam sources for film growing apparatus such as electron beam evaporation apparatus, electron sources for generating a plasma (to activate a gas or the like) in plasma CVD apparatus, and electron sources for decomposing gases. Electron emitters may also be used in vacuum micro devices including high-speed devices operable in a tera-Hz range and large-current output devices. Electron emitters may also preferably be used as printer components, i.e., light emission devices for applying light to a photosensitive drum in combination with a phosphor, and electron sources for charging dielectric materials.

The electron emitters may also be used in electronic circuit components including digital devices such as switches, relays, diodes, etc. and analog devices such as operational amplifiers, etc. as they can be designed for outputting large currents and higher amplification factors.

Figure 1:
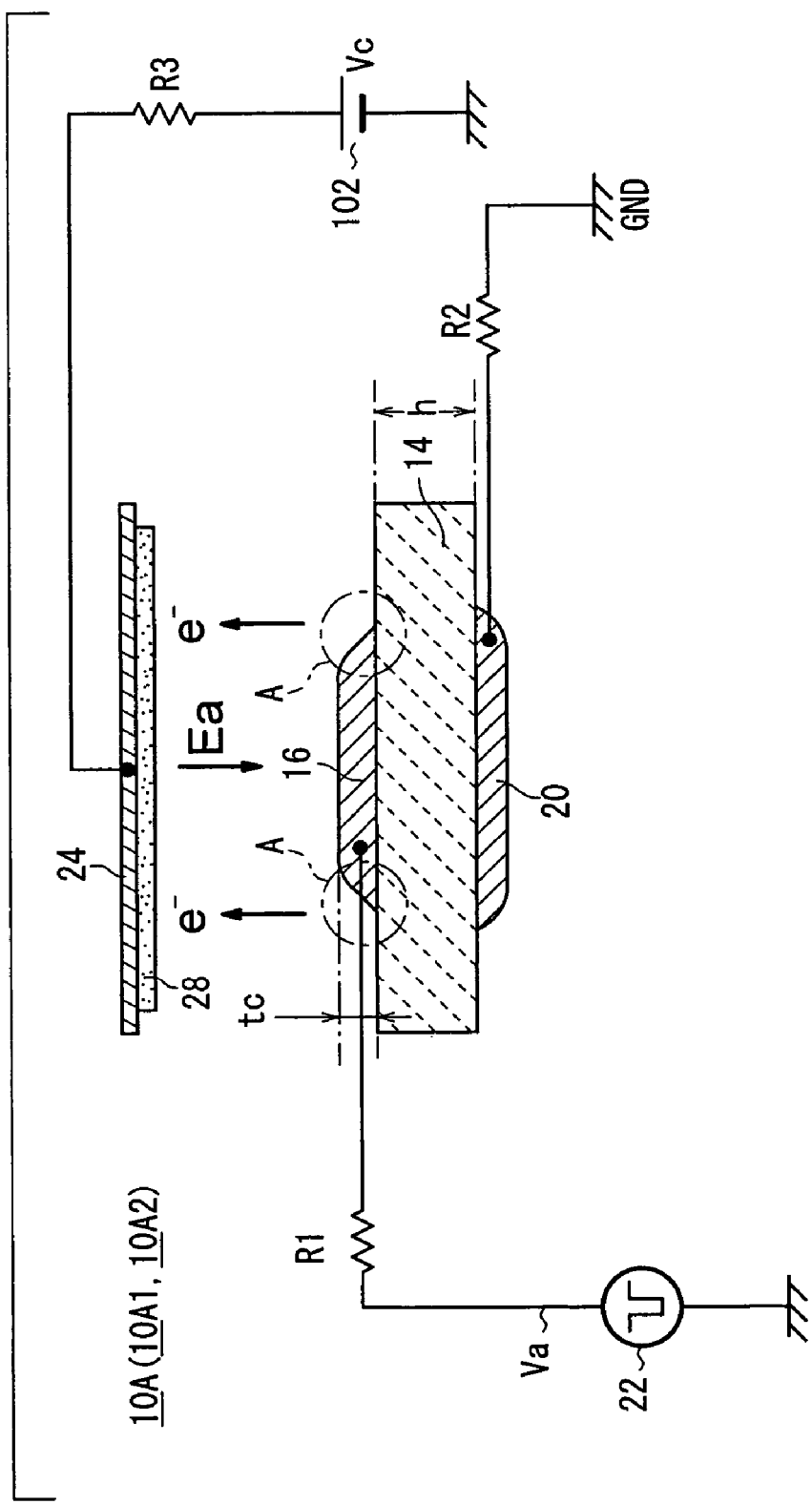
FIG. 1 is a view showing an electron emitter according to a first embodiment.

As shown in FIG. 1, an electron emitter 10A according to a first embodiment has an emitter section (substance serving as an emitter) 14 having a plate shape, a first electrode (cathode electrode) 16 formed on a front surface of the emitter section 14, a second electrode (anode electrode) 20 formed on a back surface of the emitter section 14, and a pulse generation source 22. A drive voltage Va from a pulse generation source 22 is applied between the cathode electrode 16 and the anode electrode 20 through a resistor R1.

Figure 2:
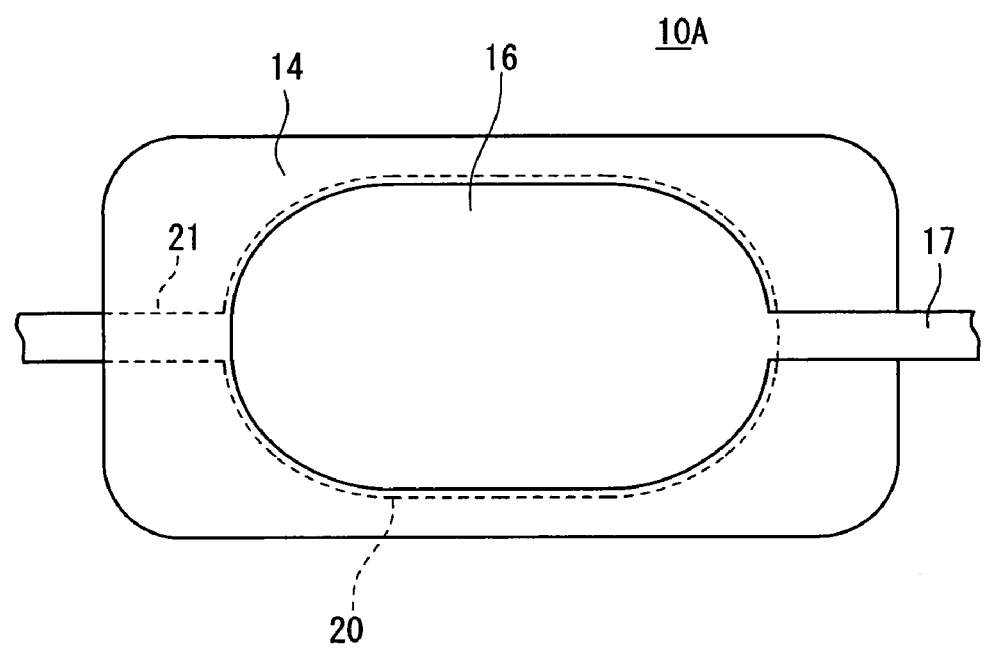
FIG. 2 is a plan view showing electrodes of the electron emitter according to the first embodiment.

In an example shown in FIG. 1, the anode electrode 20 is connected to GND (ground) through a resistor R2 and hence set to a zero potential. However, the anode electrode 20 may be set to a potential other than the zero potential. As shown in FIG. 2, the drive voltage Va is applied between the cathode electrode 16 and the anode electrode 20 through a lead electrode 17 extending from the cathode electrode 16 and a lead electrode 21 extending from the anode electrode 20, for example.

For using the electron emitter 10A as a pixel of a display, a collector electrode 24 is positioned above the cathode electrode 16, and the collector electrode 24 is coated with a phosphor 28. The collector electrode 24 is connected to a bias voltage source 102 (bias voltage VC) through a resistor R3.

The electron emitter 10A according to the first embodiment is placed in a vacuum space. As shown in FIG. 1, the electron emitter 10A has electric field concentration points A. The electric field concentration point A can be defined as a triple junction formed by the contact between the cathode electrode 16, the emitter section 14, and the vacuum. The triple junction includes a triple point where the cathode electrode 16, the emitter section 14, and the vacuum exist as one point.

The vacuum level in the atmosphere is preferably in the range from $10^2$ to $10^{-6}$ Pa and more preferably in the range from $10^{-3}$ to $10^{-5}$ Pa.

The range of the vacuum level is determined for the following reason. In a lower vacuum of greater than $10^2$ Pa, (1) since many gas molecules are present in the space, a plasma can be generated easily and, if the plasma were generated excessively, many positive ions would impinge upon the cathode electrode 16 and damage the cathode electrode 16, and (2) emitted electrons would impinge upon gas molecules prior to arrival at the collector electrode 24 and the phosphor 28, failing to sufficiently excite the phosphor 28 with electrons that are sufficiently accelerated by the collector potential (Vc).

In a higher vacuum of less than $10^{-6}$ Pa, though electrons are smoothly emitted from the electric field concentration points A, structural body such as a display panel for maintaining the vacuum space would be large in size, and a vacuum seal for sealing the high vacuum space from the outside is large, posing difficulty in making a small display.

The emitter section 14 is made of a dielectric material. The dielectric material should preferably have a high relative dielectric constant, e.g., a dielectric constant of 1000 or larger. Dielectric materials of such a nature may be ceramics including barium titanate, lead zirconate, lead magnesium niobate, lead nickel niobate, lead zinc niobate, lead manganese niobate, lead magnesium tantalate, lead nickel tantalate, lead antimony stannate, lead titanate, lead magnesium tungstenate, lead cobalt niobate, etc. or a material whose principal component contains 50 weight % or more of the above compounds, or such ceramics to which there is added an oxide of lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger relative dielectric constant at room temperature if the molar ratio of PMN is increased.

Particularly, a dielectric material where n=0.85-1.0 and m=1.0−n is preferable because its relative dielectric constant is 3000 or larger. For example, a dielectric material where n=0.91 and m=0.09 has a relative dielectric constant of 15000 at room temperature, and a dielectric material where n=0.95 and m=0.05 has a relative dielectric constant of 20000 at room temperature.

For increasing the relative dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ=0.375:0.375:0.25 has a relative dielectric constant of 5500, and a dielectric material where PMN:PT:PZ=0.5:0.375:0.125 has a relative dielectric constant of 4500, which is particularly preferable. Furthermore, it is preferable to increase the dielectric constant by mixing a metal such as platinum into these dielectric materials within a range to keep them insulative. For example, a dielectric material may be mixed with 20 weight % of platinum.

As described above, the emitter section 14 may be formed of a piezoelectric/electrostrictive layer or an antiferroelectric layer. If the emitter section 14 is a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstenate, lead cobalt niobate, or the like or a combination of any of these materials.

The emitter section 14 may be made of chief components including 50 weight % or more of any of the above compounds. Of the above ceramics, the ceramics including lead zirconate is most frequently used as a constituent of the piezoelectric/electrostrictive layer of the emitter section 14.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics. Alternatively, ceramics produced by adding $SiO_2$, $CeO_2$, $Pb_5Ge_3O_{11}$, or a combination of any of these compounds to the above ceramics may be used. Specifically, a material produced by adding 0.2 wt % of $SiO_2$, 0.1 wt % of $CeO_2$, or 1 to 2 wt % of $Pb_5Ge_3O_{11}$ to a PT-PZ-PMN piezoelectric material is preferable.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter section 14 is in the form of an antiferroelectric layer, then the antiferroelectric layer may be made of lead zirconate as a chief component, lead zirconate and lead tin as chief components, lead zirconate with lanthanum oxide added thereto, or lead zirconate and lead tin as components with lead zirconate and lead niobate added thereto.

The antiferroelectric layer may be porous. If the antiferroelectric layer is porous, then it should preferably have a porosity of 30% or less.

It is preferable that the emitter section 14 is made of strontium tantalate bismuthate ($SrBi_2Ta_2O_9$), since its polarization reversal fatigue is small. Materials whose polarization reversal fatigue is small are laminar ferroelectric compounds and expressed by the general formula of $(BiO_2)^{2+}$ $(A_{m-1}B_mO_{3m+1})^{2-}$. Ions of the metal A are $Ca^{2+}$, $Sr^{2+}$, $Ba^{2+}$, $Pb^{2+}$, $Bi^{3+}$, $La^{3+}$, etc., and ions of the metal B are $Ti^{4+}$, $Ta^{5+}$, $Nb^{5+}$, etc.

Piezoelectric/electrostrictive/antiferroelectric ceramics is mixed with glass components such as lead borosilicate glass or other compounds having a low melting point such as bismuth oxide to lower the firing temperature.

If the emitter section 14 is made of piezoelectric/electrostrictive/antiferroelectric ceramics, then it may be a sheet-like molded body, a sheet-like laminated body, or either one of such bodies stacked or bonded to another support substrate.

If the emitter section 14 is made of a non-lead-based material, then it may be a material having a high melting point or a high evaporation temperature so as to be less liable to be damaged by the impingement of electrons or ions.

The thickness h (see FIG. 1) of the emitter section 14 between the cathode electrode 16 and the anode electrode 20 is determined so that polarization reversal occurs in the electric field E represented by E=Vak/h (Vak is a voltage between the cathode electrode 16 and the anode electrode 20 when the drive voltage Va outputted form the pulse generation source 22 is applied between the cathode electrode 16 and the anode electrode 20). When the thickness h is small, the polarization reversal occurs at a low voltage, and electrons are emitted at the low voltage (e.g., less than 100V).

The cathode electrode 16 is made of materials described below. The cathode electrode 16 should preferably be made of a conductor having a small sputtering yield and a high evaporation temperature in vacuum. For example, materials having a sputtering yield of 2.0 or less at 600 V in Ar+ and an evaporation temperature of 1800 K or higher at an evaporation pressure of $1.3 \times 10^{-3}$ Pa are preferable. Such materials include platinum, molybdenum, tungsten, etc.

Further, the cathode electrode 16 is made of a conductor which is resistant to a high-temperature oxidizing atmosphere, e.g., a metal, an alloy, a mixture of insulative ceramics and a metal, or a mixture of insulative ceramics and an alloy. Preferably, the cathode electrode 16 should be composed chiefly of a precious metal having a high melting point, e.g., platinum, iridium, palladium, rhodium, molybdenum, or the like, or an alloy of silver and palladium, silver and platinum, platinum and palladium, or the like, or cermet of platinum and ceramics. Further preferably, the cathode electrode 16 should be made of platinum only or a material composed chiefly of a platinum-base alloy.

The electrode should preferably be made of carbon or a graphite-base material, e.g., diamond thin film, diamond-like carbon, or carbon nanotube. Ceramics to be added to the electrode material should preferably have a proportion ranging from 5 to 30 volume %.

Further, preferably, organic metal pastes which produce a thin film after firing, such as a platinum resinate paste are used. Further, for preventing fatigue due to polarization reversal, an oxide electrode is used. The oxide electrode is made of any of ruthenium oxide ($RuO_2$), iridium oxide ($IrO_2$), strontium ruthenate ($SrRuO_3$), $La_{1-x}Sr_xCoO_3$ (e.g., x=0.3 or 0.5), $La_{1-x}Ca_xMnO_3$ (e.g., x=0.2), $La_{1-x}Ca_xMn_{1-y}CO_yO_3$ (e.g., x=0.2, y=0.05). Alternatively, the oxide electrode is made by mixing any of these materials with platinum resinate paste, for example.

A cermet electrode including piezoelectric/electrostrictive material may be used as the cathode electrode 16 so that that the cathode electrode 16 can be closely in contact with the piezoelectric/electrostrictive material of the emitter section 14, and durability can be improved. In this case, it is preferable that the cermet electrode is formed by mixing the piezoelectric/electrostrictive material with a thick film paste of platinum. Preferably, the piezoelectric/electrostrictive material mixed with the thick film paste of platinum has a proportion ranging from 10 to 40 volume %. If the proportion is less than 10 volume %, it is not possible to achieve the close contact of the cathode electrode 16 and the emitter section 14. If the proportion exceeds 40%, platinum may be separated from the cathode electrode 16.

The cathode electrode 16 may be made of any of the above materials by an ordinary film forming process which may be any of various thick-film forming processes including screen printing, spray coating, dipping, coating, electrophoresis, etc., or any of various thin-film forming processes including sputtering, an ion beam process, vacuum evaporation, ion plating, chemical vapor deposition (CVD), plating, etc. Preferably, the cathode electrode 16 is made by any of the above thick-film forming processes.

Figure 3:
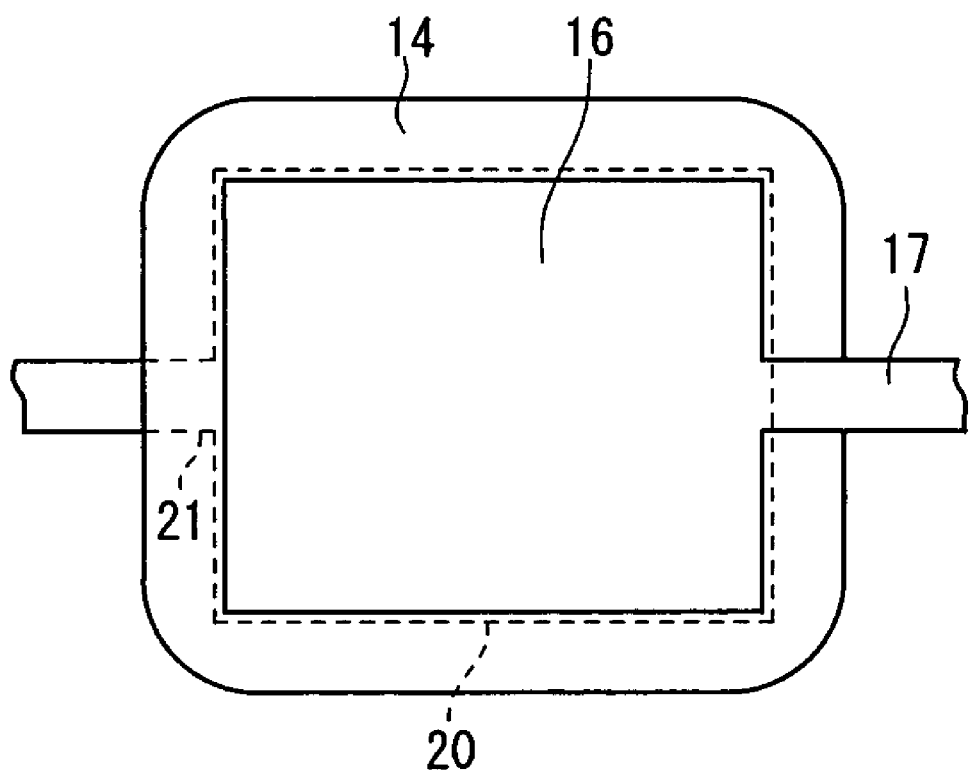
FIG. 3 is a plan view showing electrodes in a first modification of the electron emitter according to the first embodiment.
Figure 4:
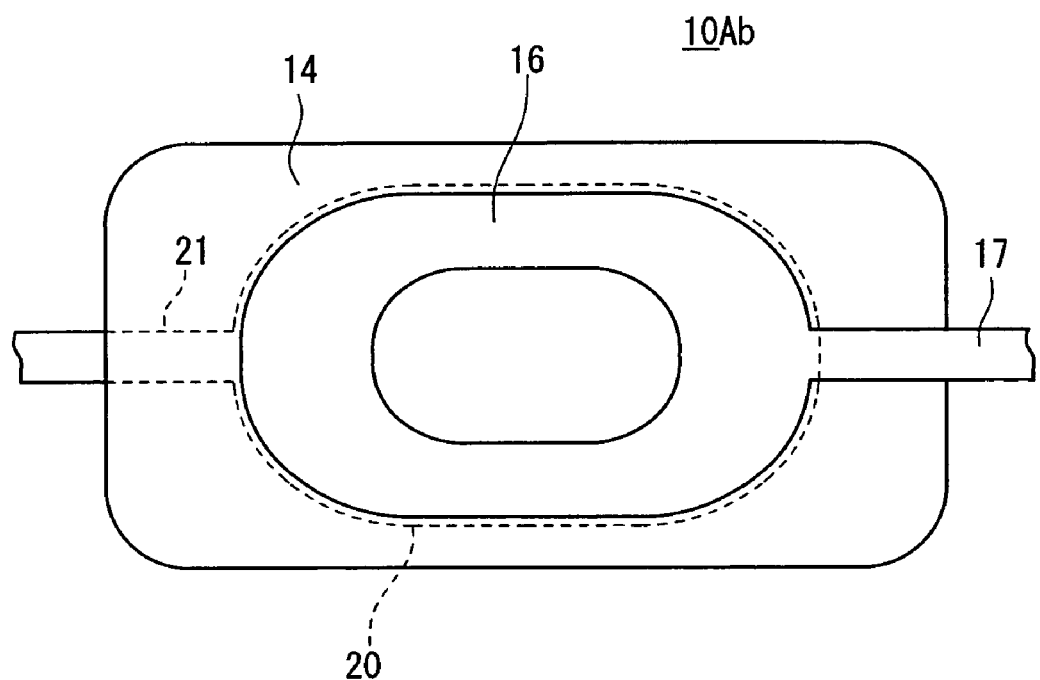
FIG. 4 is a plan view showing electrodes in a second modification of the electron emitter according to the first embodiment.
Figure 5:
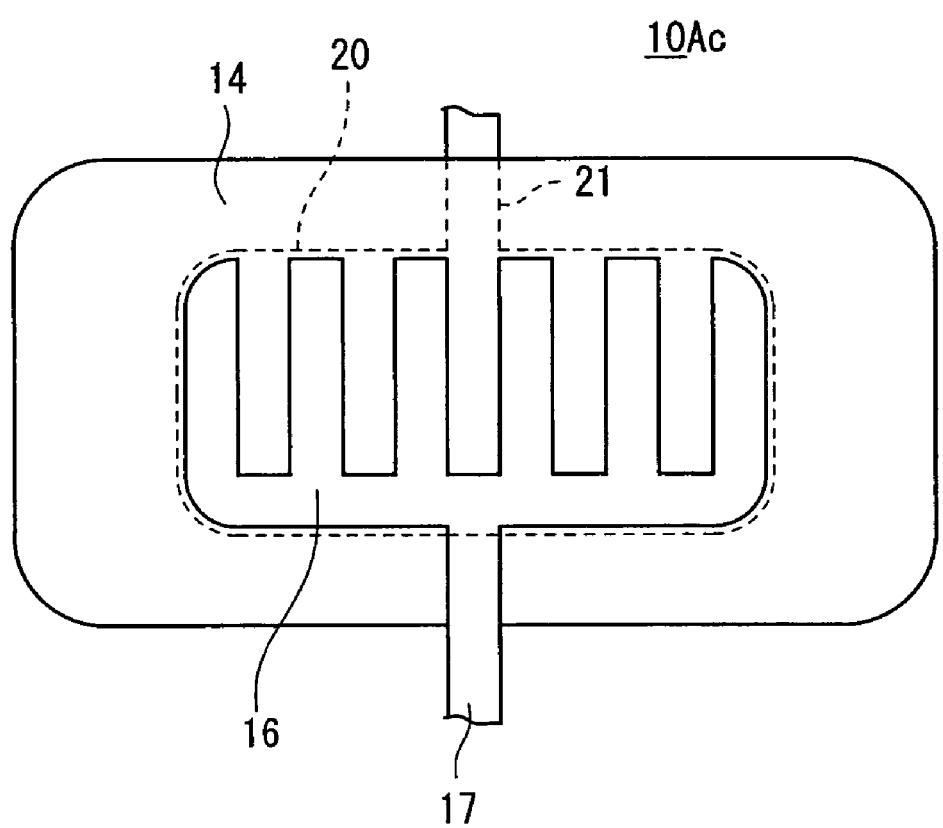
FIG. 5 is a view showing electrodes in a third modification of the electron emitter according to the first embodiment.

The cathode electrode 16 may have an oval shape as shown in a plan view of FIG. 2, or a rectangular shape like an electron emitter 10Aa of a first modification as shown in a plan view of FIG. 3, or a ring shape like an electron emitter 10Ab of a second modification as shown in a plan view of FIG. 4. Alternatively, the cathode electrode 16 may have a comb teeth shape like an electron emitter 10Ac of a third modification as shown in FIG. 5.

When the cathode electrode 16 having a rectangular shape is used, particularly large electric field concentration is achieved at four vertices of the rectangle. Thus, the efficiency of electron emission is improved.

When the cathode electrode 16 having a ring shape or a comb teeth shape in a plan view is used, the number of triple junctions (electric field concentration points A) of the cathode electrode 16, the emitter section 14, and the vacuum is increased. Further, since the area of emitter section 14 exposed to the vacuum is increased, the capacitance is increased in the region which emits electrons, and the capacitance is decreased in the region which does not emit electrons. Accordingly, the electron emission efficiency is further improved. Thus, the electron emitter 10A is driven with a low power consumption.

Figure 6:
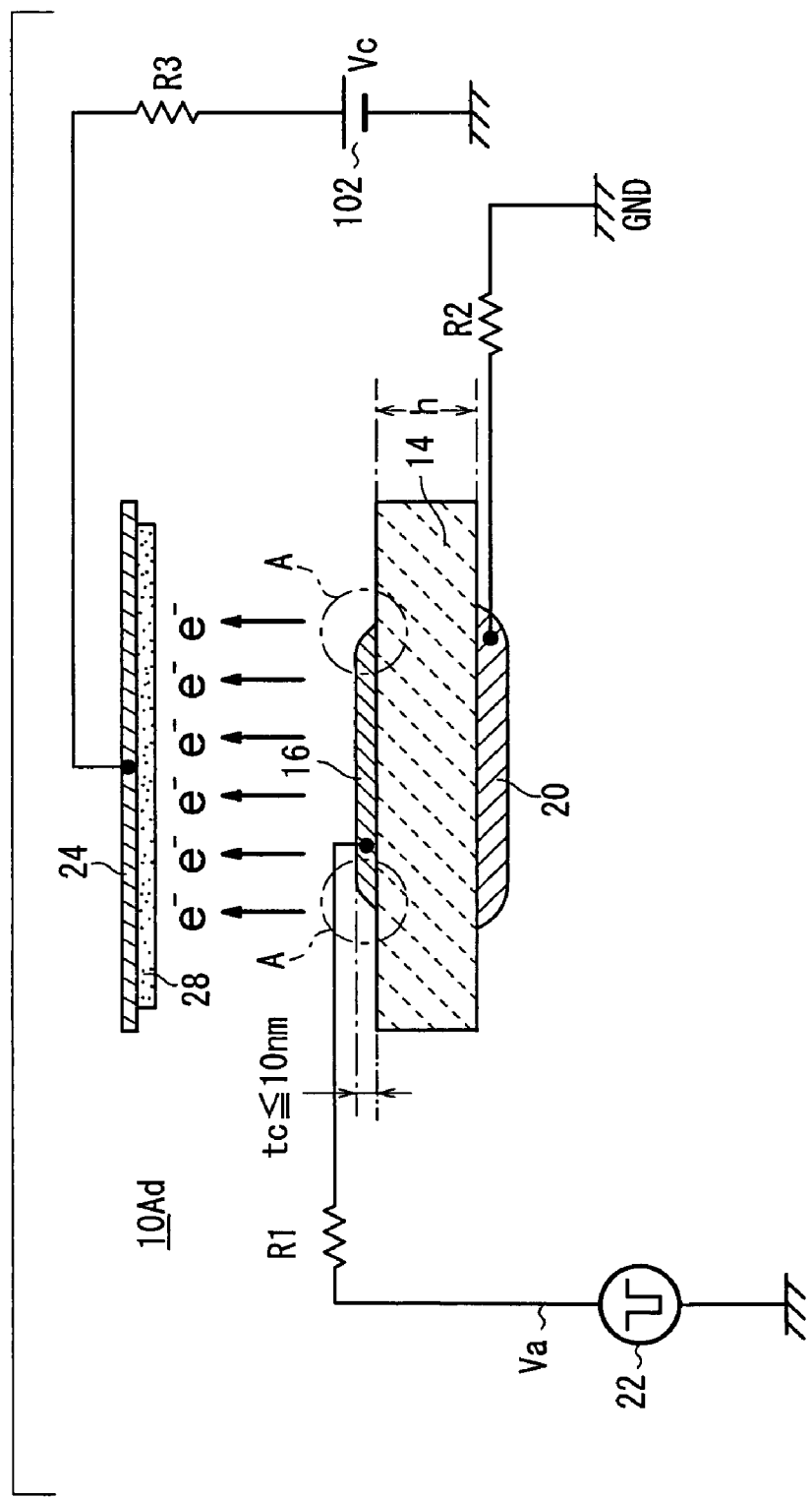
FIG. 6 is a view showing a fourth modification of the electron emitter according to the first embodiment.

Preferably, the cathode electrode 16 has a thickness tc (see FIG. 1) of 20 µm or less, or more preferably 5 µm or less. The cathode electrode 16 may have a thickness tc of 100 nm or less. In particular, an electron emitter 10Ad of a fourth modification shown in FIG. 6 is very thin, having a thickness tc of 10 nm or less. In this case, electrons are emitted from the interface between the cathode electrode 16 and the emitter section 14, and thus, the efficiency of electron emission is further improved.

The anode electrode 20 is made of the same material by the same process as the cathode electrode 16. Preferably, the anode electrode 20 is made by any of the above thick-film forming processes. Preferably, the anode electrode 20 has a thickness tc of 20 µm or less, or more preferably 5 µm or less.

Each time the emitter section 14, the cathode electrode 16, or the anode electrode 20 is formed, the assembly is heated (fired) into an integral structure. Depending on the process by which the cathode electrode 16 and the anode electrode 20 are formed, they may not be heated (fired) so as to be integrally combined together.

The firing process for integrally combining the emitter section 14, the cathode electrode 16, and the anode electrode 20 may be carried out at a temperature ranging from 500° to 1400° C., preferably from 1000° to 1400° C. For heating the emitter section 14 which is in the form of a film, the emitter section 14 should be fired together with its evaporation source while their atmosphere is being controlled.

The emitter section 14 may be covered with an appropriate member for preventing the surface of the emitter section 14 from being directly exposed to the firing atmosphere when the emitter section 14 is fired.

The principles of electron emission of the electron emitter 10A will be described below with reference to FIGS. 1, and 7 through 12B.

Figure 7:
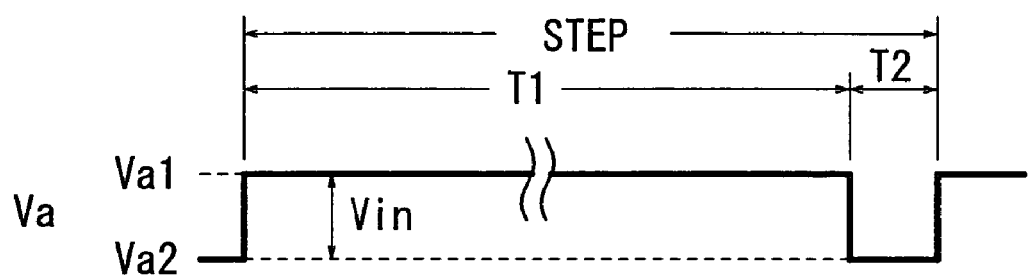
FIG. 7 is a waveform diagram showing a drive voltage outputted from a pulse generation source.

As shown in FIG. 7, the drive voltage Va outputted from the pulse generation source 22 has repeated steps each including a period in which a first voltage Va1 is outputted (preparatory period T1) and a period in which a second voltage Va2 is outputted (electron emission period T2). The first voltage Va1 is such a voltage that the potential of the cathode electrode 16 is higher than the potential of the anode electrode 20, and the second voltage Va2 is such a voltage that the potential of the cathode electrode 16 is lower than the potential of the anode electrode 20. The amplitude Vin of the drive voltage Va can be defined as the difference (=Va1-Va2) between the first voltage Va1 and the second voltage Va2.

Figure 8:
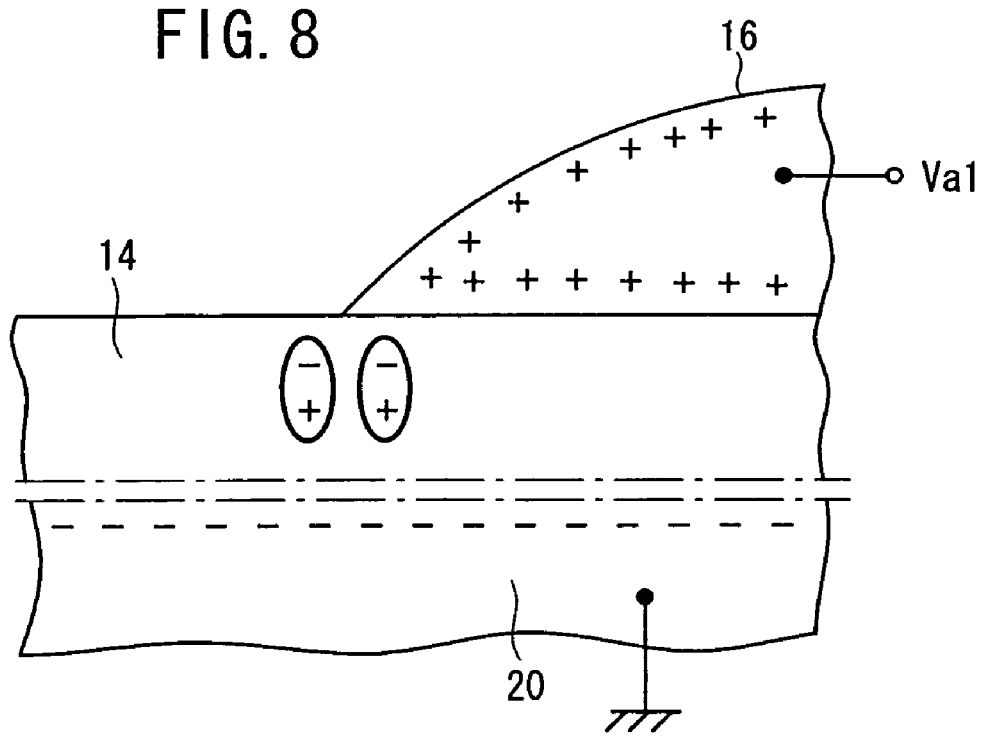
FIG. 8 is a view illustrative of operation when a first voltage is applied between a cathode electrode and an anode electrode according to the first embodiment.

The preparatory period T1 is a period in which the first voltage Va1 is applied between the cathode electrode 16 and the anode electrode 20 to polarize the emitter section 14, as shown in FIG. 8. The first voltage Va1 may be a DC voltage, as shown in FIG. 7, but may be a single pulse voltage or a succession of pulse voltages. The preparatory period T1 should preferably be longer than the electron emission period T2 for sufficient polarization. For example, the preparatory period T1 should preferably be 100 μsec. or longer. This is because the absolute value of the first voltage Va1 for polarizing the emitter section 14 is smaller than the absolute value of the second voltage Va2 to reduce the power consumption at the time of applying the first voltage Va1, and to prevent the damage of the cathode electrode 16.

Preferably, the voltage levels of the first voltage Va1 and the second voltage Va2 are determined so that the polarization to the positive polarity and the negative polarity can be performed reliably. For example, if the dielectric material of the emitter section 14 has a coercive voltage, preferably, the absolute values of the first voltage Va1 and the second voltage Va2 are the coercive voltage or higher.

Figure 9:
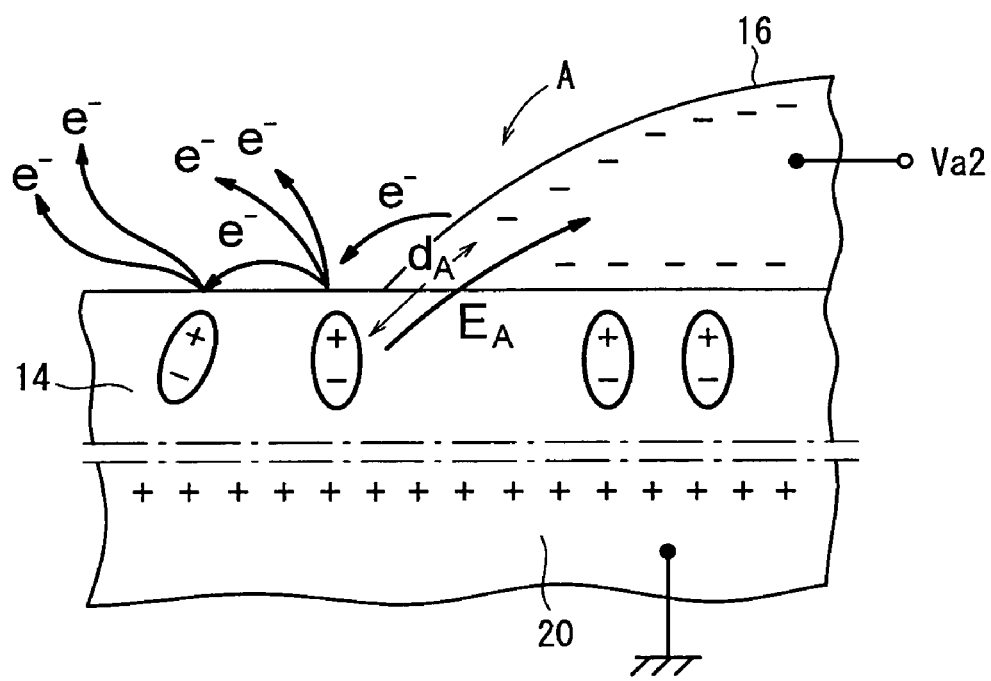
FIG. 9 is a view illustrative of operation of electron emission when a second voltage is applied between the cathode electrode and the anode electrode.

The electron emission period T2 is a period in which the second voltage Va2 is applied between the cathode electrode 16 and the anode electrode 20. When the second voltage Va2 is applied between the cathode electrode 16 and the anode electrode 20, as shown in FIG. 9, the polarization of at least part of the emitter section 14 is reversed. Specifically, the polarization reversal occurs in a region of the emitter section 14 which is underneath the cathode electrode 16. Further, since the polarization changes in a region of the emitter section 14 near the cathode electrode 16, and the polarization reversal also occurs in the exposed region near the cathode electrode 16. Because of the polarization reversal, a locally concentrated electric field is generated on the cathode electrode 16 and the positive poles of dipole moments in the vicinity thereof, emitting primary electrons from the cathode electrode 16. The primary electrons emitted from the cathode electrode 16 impinge upon the emitter section 14, causing the emitter section 14 to emit secondary electrons.

In the first embodiment, the electron emitter 10A has the electric field concentration point (triple junction) A where the cathode electrode 16, the emitter section 14, and the vacuum are present at one point, primary electrons are emitted from the cathode electrode 16 near the triple junction, and the primary electrons thus emitted from the triple junction impinge upon the emitter section 14, causing the emitter section 14 to emit secondary electrons. If the thickness of the cathode electrode 16 is very small (up to 10 nm), then electrons are emitted from the interface between the cathode electrode 16 and the emitter section 14.

Operation by application of the second voltage Va2 will be described in detail below.

When the second voltage Va2 is applied between the cathode electrode 16 and the anode electrode 20, electrons are emitted from the emitter section 14. Specifically, in the emitter section 14, dipole moments near the cathode electrode 16 are charged when the polarization of the emitter section 14 has been reversed or changed. Thus, emission of the electrons occurs.

A local cathode is formed in the cathode electrode 16 in the vicinity of the interface between the cathode electrode 16 and the emitter section 14, and positive poles of the dipole moments charged in the area of the emitter section 14 near the cathode electrode 16 serve as a local anode which causes the emission of electrons from the cathode electrode 16. Some of the emitted electrons are guided to the collector electrode 24 (see FIG. 1) to excite the phosphor 28 to emit light from the phosphor 28 to the outside. Further, some of the emitted electrons impinge upon the emitter section 14 to cause the emitter section 14 to emit secondary electrons. The secondary electrons are guided to the collector electrode 24 to excite the phosphor 28.

Figure 11:
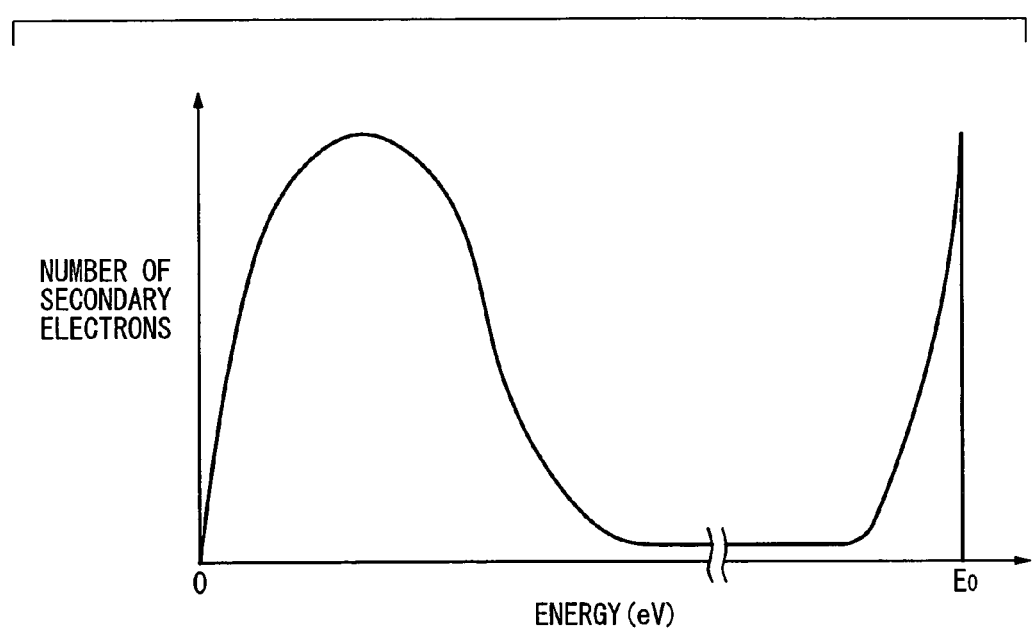
FIG. 11 is a view showing relationship between the energy of the emitted secondary electrons and the number of emitted secondary electrons.

Distribution of emitted secondary electrons will be described below with reference to FIG. 11. As shown in FIG. 11, most of the secondary electrons have an energy level near zero. When the secondary electrons are emitted from the surface of the emitter section 14 into the vacuum, they move according to only an ambient electric field distribution. Specifically, the secondary electrons are accelerated from an initial speed of about 0 (m/sec) according to the ambient electric field distribution. Therefore, as shown in FIG. 1, if an electric field Ea is generated between the emitter section 14 and the collector electrode 24, the secondary electrons have their emission path determined along the electric field Ea. Therefore, the electron emitter section 14 can serve as a highly straight electron source. The secondary electrons which have a low initial speed are electrons which are emitted from the solid emitter section 14 by an energy that has been generated by a coulomb collision with primary electrons.

As can be seen from FIG. 11, secondary electrons having an energy level which corresponds to the energy $E_0$ of primary electrons are emitted. These secondary electrons are primary electrons that are emitted from the cathode electrode 16 and scattered in the vicinity of the surface of the emitter section 14 (reflected electrons). The secondary electrons referred herein include both the reflected electrons and Auger electrons.

If the thickness of the cathode electrode 16 is very small (up to 10 nm), then primary electrons emitted from the cathode electrode 16 are reflected by the interface between the cathode electrode 16 and the emitter section 14, and directed toward the collector electrode 24.

The intensity $E_A$ of the electric field at the electric field concentration point A satisfies the equation $E_A=V(la, lk)/d_A$ where V(la, lk) represents the potential difference between the local anode and the local cathode, and $d_A$ represents the distance between the local anode and the local cathode. Because the distance $d_A$ between the local anode and the local cathode is very small, it is possible to easily obtain the intensity $E_A$ of the electric field which is required to emit electrons (the large intensity $E_A$ of the electric field is indicated by the solid-line arrow in FIG. 9). This ability to easily obtain the intensity $E_A$ of the electric field leads to a reduction in the voltage Vak.

As the electron emission from the cathode electrode 16 progresses, floating atoms of the emitter section 14 which are evaporated due to the Joule heat are ionized into positive ions and electrons by the emitted electrons. The electrons generated by the ionization ionize the atoms of the emitter section 14. Therefore, the electrons are increased exponentially to generate a local plasma in which the electrons and the positive ions are neutrally present. The positive ions generated by the ionization may impinge upon the cathode electrode 16, possibly damaging the cathode electrode 16.

Figure 10:
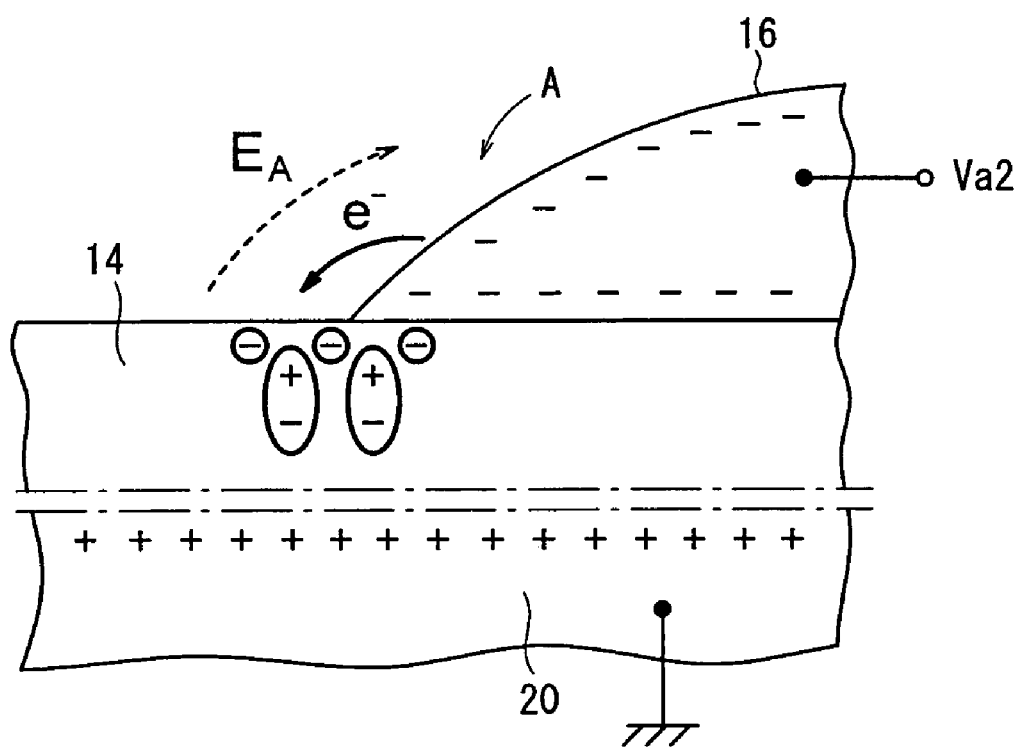
FIG. 10 is a view showing operation of self-stop of electron emission when the emitter section is charged negatively.

In the electron emitter 10A according to the first embodiment, as shown in FIG. 10, the electrons emitted from the cathode electrode 16 are attracted to the positive poles, which are present as the local anode, of the dipole elements in the emitter section 14, negatively charging the surface of the emitter section 14 near the cathode electrode 16. As a result, the factor for accelerating the electrons (the local potential difference) is lessened, and any potential for emitting secondary electrons is eliminated, further progressively negatively charging the surface of the emitter section 14.

Therefore, the positive polarity of the local anode provided by the dipole moments is weakened, and the intensity $E_A$ of the electric field between the local anode and the local cathode is reduced (the small intensity $E_A$ of the electric field is indicated by the broken-line arrow in FIG. 10). Thus, the electron emission is stopped.

Figure 12A:
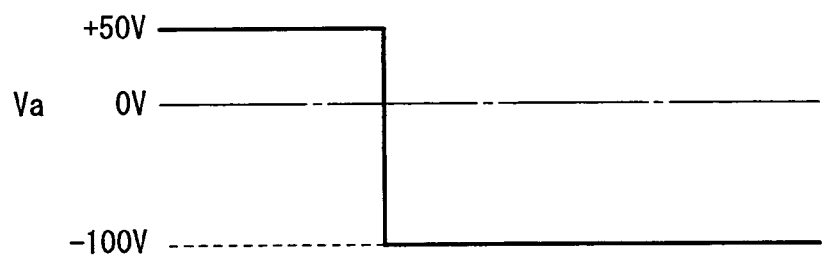
FIG. 12A is a waveform diagram showing an example of a drive voltage.
Figure 12B:
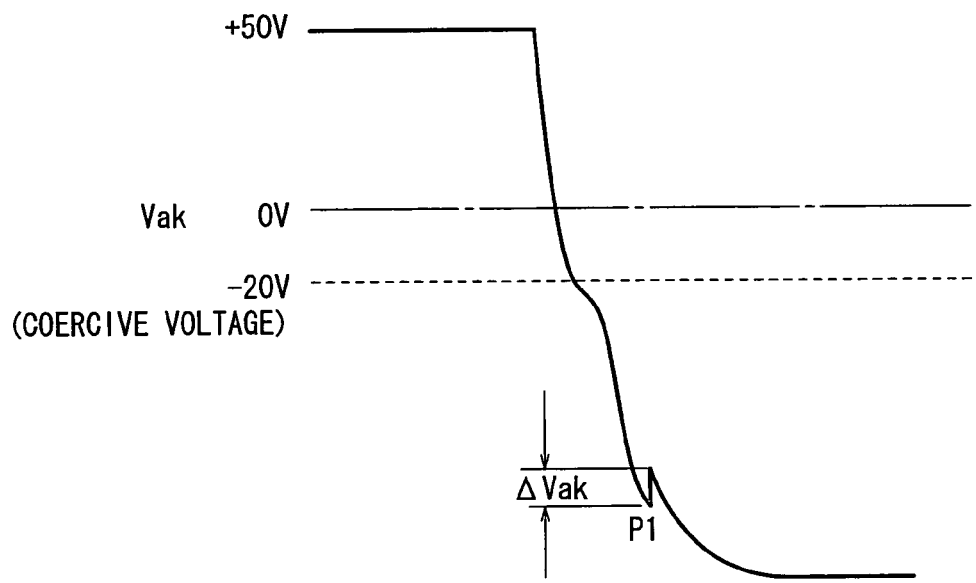
FIG. 12B is a waveform diagram showing the change of the voltage applied between the anode electrode and the cathode electrode of the electron emitter according to the first embodiment.

As shown in FIG. 12A, the drive voltage Va applied between the cathode electrode 16 and the anode electrode 20 has a positive voltage Va1 of 50V, and a negative voltage Va2 of −100V. The change ΔVak of the voltage between the cathode electrode 16 and the anode electrode 20 at the time P1 (peak) the electrons are emitted is 20V or less (about 10 V in the example of FIG. 12B), and very small. Consequently, almost no positive ions are generated, thus preventing the cathode electrode 16 from being damaged by positive ions. This arrangement is thus effective to increase the service life of the electron emitter 10A.

In the electron emitter 10A, in the preparatory period T1 of the next cycle after the electron emission period T2, again, the potential of the cathode electrode 16 becomes higher than the potential of the anode electrode 20 (negative poles of the dipole moments appear on the surface of the emitter section 14). Therefore, negative charges on the surface of the emitter section 14 which caused interruption of the electron emission disappear. By applying an alternating pulse, in every electron emission period T2, it is possible to achieve the sufficient electric field intensity $E_A$. Thus, the electrons are emitted stably.

Preferably, the dielectric breakdown voltage of the emitter section 14 is at least 10 kV/mm or higher. In the embodiment, when the thickness h (see FIG. 1) of the emitter section 14 is 20 µm, even if the drive voltage of −100V is applied between the cathode electrode 16 and the anode electrode 20, the emitter section 14 does not break down dielectrically.

The emitter section 14 is likely to be damaged when electrons emitted from the emitter section 14 impinge upon the emitter section 14 again or when ionization occurs near the surface of the emitter section 14. Due to the damages to the crystallization, the mechanical strength and the durability of the emitter section 14 are likely to be lowered.

In order to avoid the problem, preferably, the emitter section 14 is made of a dielectric material having a high evaporation temperature in vacuum. For example, the emitter section 14 may be made of $BaTiO_3$ or $Ba_{1-x}Sr_xTiO_3$ which does not include Pb. Thus, the emitter section 14 is not evaporated into floating atoms easily due to the Joule heat, and the ionization by the emitted electrons is prevented. Therefore, the surface of the emitter section 14 is effectively protected.

Further, the pattern or the potential of the collector electrode 24 may be changed suitably depending on the application. If a control electrode (not shown) or the like is provided between the emitter section 14 and the collector electrode 24 for arbitrarily setting the electric field distribution between the emitter section 14 and the collector electrode 24, the emission path of the emitted secondary electrons can be controlled easily. Thus, it is possible to change the size of the electron beam by converging and expanding the electron beam, and to change the shape of the electron beam easily.

Figure 13:
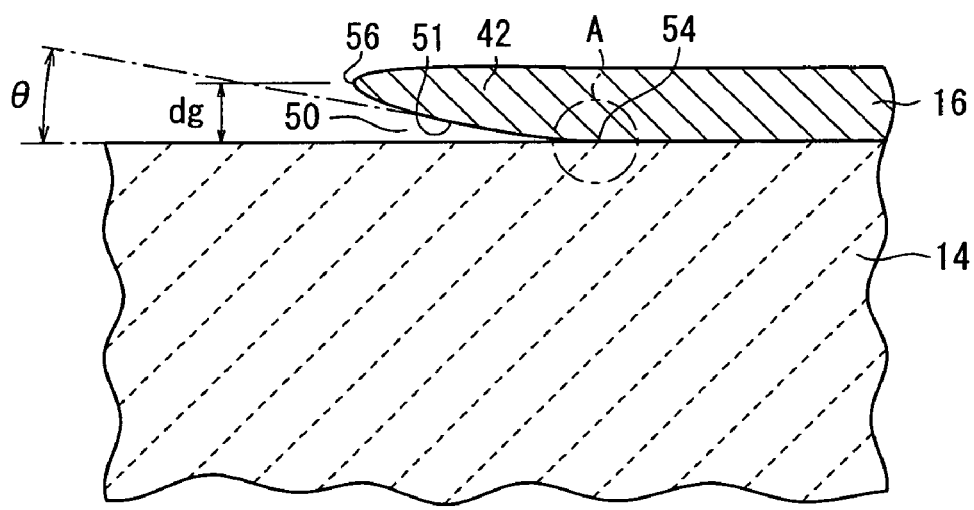
FIG. 13 is a view showing an electron emitter according to a first specific example.

Next, an electron emitter 10A1 according to a first specific example of the electron emitter 10A according to the first embodiment will be described below. As shown in FIG. 13, in the electron emitter 10A according to the first specific example, a gap 50 is formed between an outer peripheral portion 42 of the cathode electrode 16 and the surface of the emitter section 14.

In this case, the gap 50 expands from a base end 54 toward a tip end 56 of the outer peripheral portion 42. The base end 54 is a triple junction A where the surface of the emitter section 14 is in contact with a lower surface 51 of the outer peripheral portion 42.

It is preferable that the tip end 56 of the outer peripheral portion 42 has an acute shape. Further, it is preferable that the maximum distance dg of the gap 50 is in the range of 0.1 µm to 10 µm. Further, it is preferable that the angle θ between the lower surface 51 of the outer peripheral portion 42 and the surface of the emitter section is 90° or less.

Figure 14A:
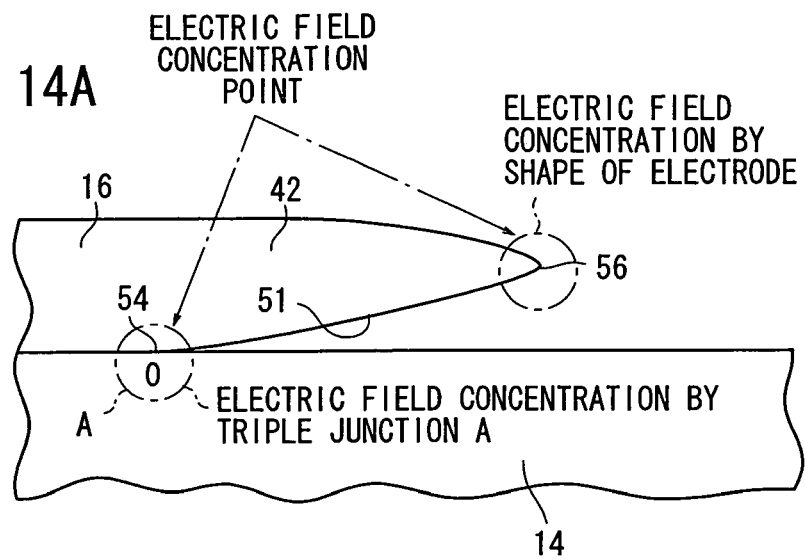
FIG. 14A is a view showing electric field concentration points in the electron emitter in FIG. 13.

In the electron emitter 10A1, when the drive voltage Va is applied between the cathode electrode 16 and the anode electrode 20, in the preparatory period T1, an electric field concentration occurs at the tip end 56, and an electric field concentration also occurs at the base end 54 as the triple junction A. As shown in FIG. 14A, the electric field concentration occurs in the region near the base end 54 and the region near the tip end 56 of the outer peripheral portion 42.

Figure 14B:
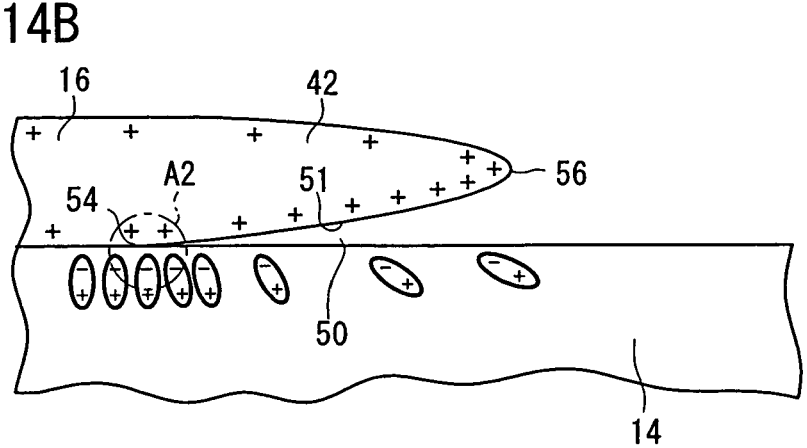
FIG. 14B is a view showing electron emission in the electron emitter in FIG. 13.

By this electric field, in the preparatory period T1, as shown in FIG. 14B, large polarization occurs in the emitter section 14 near the base end 54. Further, if the tip end 56 has the acute shape, the electric field concentrated at the tip end 56 is large.

Thus, in the preparatory period T1, a polarization change occurs in emitter section 14 from the region of the triple junction A near the base end 54 to the region facing the tip end 56. Therefore, the electrons are easily emitted from the region near the base end 54 as the triple junction A, and the region near the tip end 56 where the electric field concentration occurs by the shape of the electrode.

The electrons move in any of the following manners (1) to (3). (1) Some of the emitted electrons are reflected on the surface of the emitter section 14, and the reflected electrons are emitted form the surface of the emitter section 14 toward the phosphor 28. (2) Some of the emitted electrons impinge upon the surface of the emitter section 14 to induce generation of secondary electrons which are emitted from the surface of the emitter section 14 to the phosphor 28. (3) Some of the emitted electrons are directly radiated to the phosphor 28.

Figure 15A:
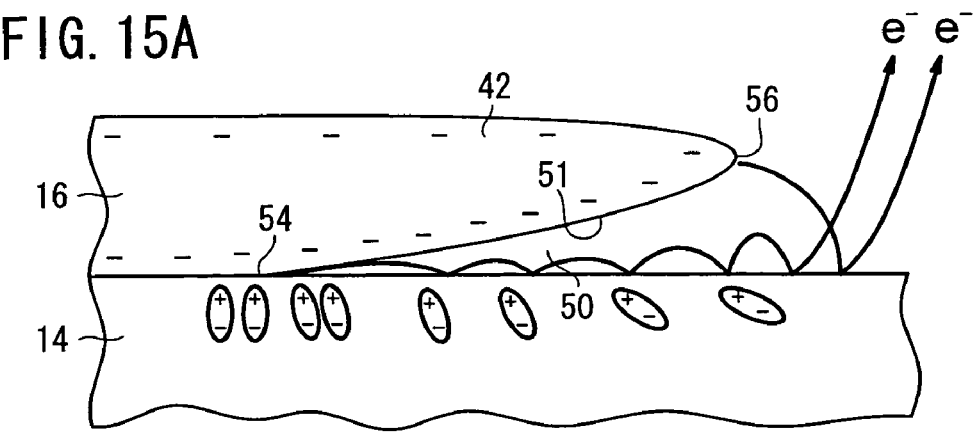
FIG. 15A is a view showing emission of electrons drawn from the cathode electrode.
Figure 15B:
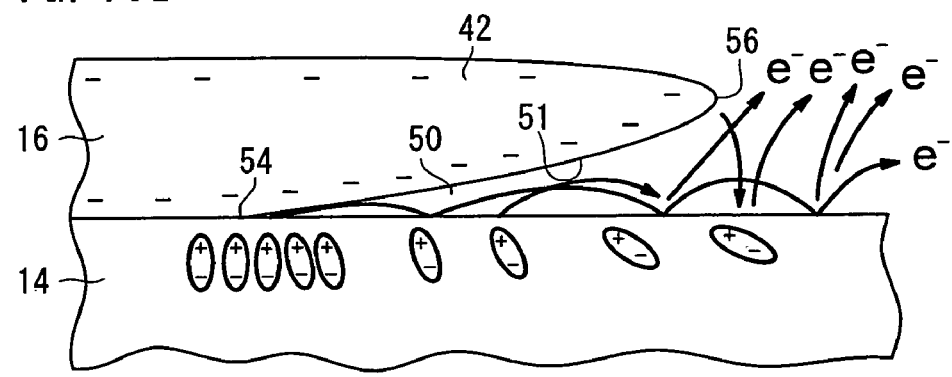
FIG. 15B is a view showing emission of electrons and secondary electrons drawn from the cathode electrode.

In the movements (1) to (3) as described above, (A) some electrons may be reflected on the surface of the emitter section 14 multiple times, and move along the surface of the emitter section 14 as shown in FIG. 15A, and (B) some electrons (including secondary electrons) may be reflected on the surface of the emitter section 14 multiple times, while increasing the number of electrons by generating new secondary electron during movement along the surface of the emitter section 14 as shown in FIG. 15B.

By the electron emission mechanism, the electrons are emitted from the electron emitter 10A1.

As described above, in the electron emitter 10A1 according to the first specific example, since the gap 50 is formed between the outer peripheral portion 42 of the cathode electrode 16 and the emitter section 14, part of the emitter section 14 under the gap 50 is also utilized as the region where the polarization reversal occurs for electron emission. Thus, the area for electron emission is increased in the electron emitter 10A1.

Further, in addition to the base end 54 as the triple junction A, the electric field concentration also occurs at the tip end 56 of the outer peripheral portion 42. The polarization reversal occurs in the emitter section 14 from the region near the base end 54 to the region facing (near) the tip end 56. Further, the electric field concentration occurs at the tip end 56. Thus, in the emitter section 14, it is possible to emit electrons not only from the region near the base end 54 but also from the region facing (near) the tip end 56.

Further, since it is possible to increase the area for electron emission from the electron emitter 10A1 simply by increasing the outer circumferential distance of the outer peripheral portion 42, the electrode structures as shown in FIGS. 2 to 5 can be suitably used in the electron emitter 10A1.

Next, methods (first and second production methods) of forming the gap 50 in the electron emitter 10A1 will be described.

Figure 16:
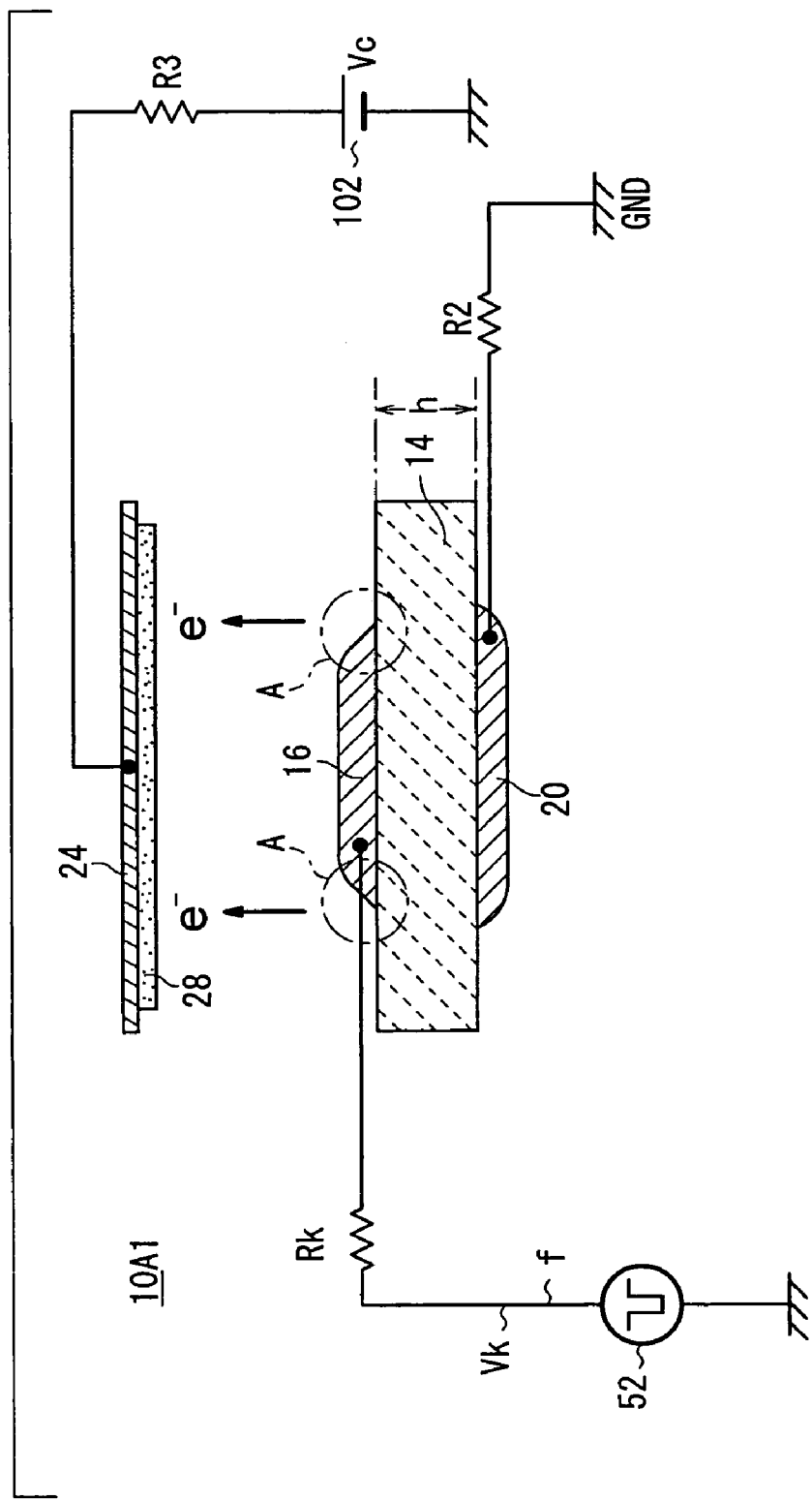
FIG. 16 is a view showing a method (first method) of producing the electron emitter according to the first specific example.

In the first production method, as shown in FIG. 16, the gap 50 is formed by applying a high voltage Vk between the cathode electrode 16 and the anode electrode 20 which are formed in contact with the emitter section 14.

Figure 17:
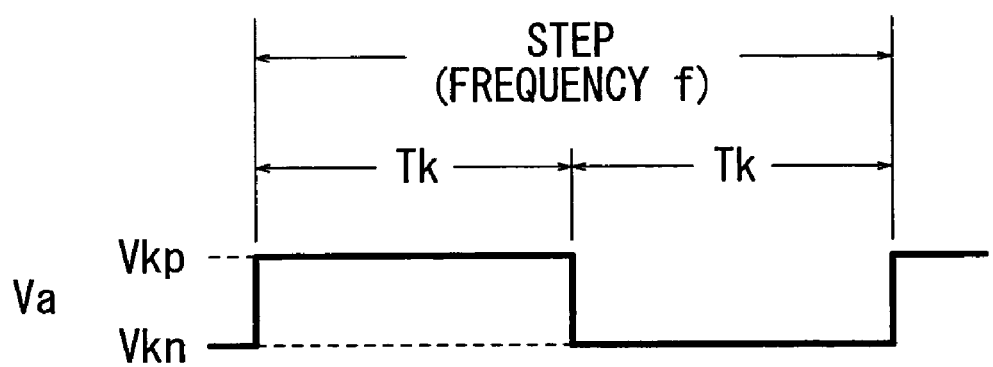
FIG. 17 is a waveform diagram showing a high voltage applied to the electron emitter in the first method.

The high voltage Vk is an alternating pulse having a frequency f as shown FIG. 17. The voltage Vk repeatedly changes between the positive voltage VkP and the negative voltage Vkn in every period Tk. The high voltage Vk includes the drive voltage Va.

In this case, an end of the pulse generation source 52 is connected to the cathode electrode 16 formed on the surface of the emitter section 14 through a resistor Rk, and the anode electrode 20 is connected to the ground. The other end of the pulse generation source 52 is connected to the ground.

Figure 18:
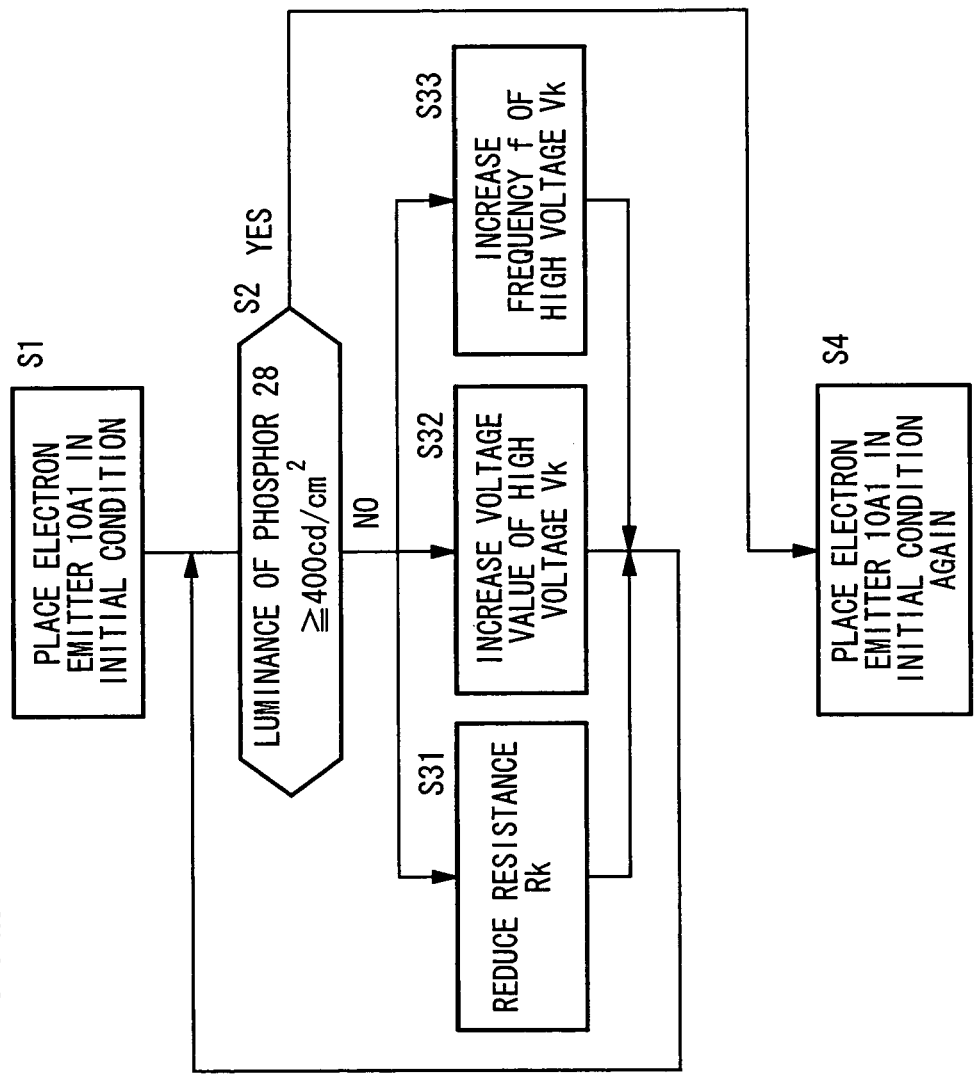
FIG. 18 is a flow chart showing the first method.

In the arrangement, firstly, as shown in FIG. 16 and a flow chart in FIG. 18, while a bias voltage Vc is supplied to the collector electrode 24, the high voltage Vk from the pulse generation source 52 is supplied to the cathode electrode 16 (step S1). Thus, the electrons are emitted from the triple junction A of the cathode electrode 16. The electrons are emitted from the emitter section 14 toward the phosphor 28. When the emitted electrons reach the phosphor 28, the phosphor 28 is excited to emit light. The luminance of the phosphor 28 in this condition is measured. This condition is defined as the initial condition.

The initial condition includes a condition in which the electron emitter 10A1 is used normally. Further, in a display including the electron emitter 10A1, the condition in which the display is used normally is included in the initial condition.

In this case, for example, assuming that the resistance of the resistor Rk is 200 kΩ, the high voltage pulse Vk is ±100V (the positive voltage Vkp=100V, and the negative voltage Vkn=−100V), the frequency f of the high voltage pulse Vk is 60 Hz, and the collector voltage Vc is 3 kV, the luminance of the phosphor 28 is 10 cd/cm$^2$. In this embodiment, a commercial frequency of 60 Hz is used as the frequency f. Alternatively, another commercial frequency of 50 Hz may be used as the frequency f.

Next, it is determined whether the luminance of the phosphor 28 is a predetermined luminance or not (step S2). 400 cd/cm$^2$ is set as the predetermined luminance. At this time, if the luminance of the phosphor 28 is the predetermined luminance, it is determined that the gap 50 is formed, and the routine proceeds to step S4 to finish the process of forming the gap 50, and the condition is brought back to the initial condition. If the luminance of the phosphor 28 is not the predetermined luminance, the routine proceeds to the next steps S31 to S33.

Then, one of the following three processes, or two or more of the following three processes are carried out in combination to cause very large electron emission between the outer peripheral portion 42 of the cathode electrode 16 and the emitter section 14. In the region where the large electron emission occurs, a plaza may be generated. By the electron emission, the outer peripheral portion 42 of the cathode electrode 16 is melted, and rolls up from the surface of the emitter section 14. That is, the rolled outer peripheral portion 42 is peeled off from the surface of the emitter section 14. Thus, the gap 50 is formed between the outer peripheral portion 42 and the surface of the emitter section 14.

Figure 19A:
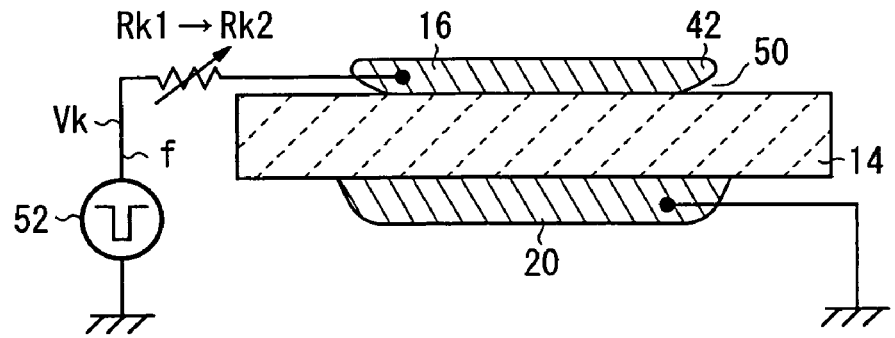
FIG. 19A is a view showing a first process in the first method.

In the first process, as shown in FIG. 19A, the resistance value of the resistor Rk is changed from a resistance RK1 in the initial condition to a resistance Rk2 which is lower than the resistance RK1. In this condition, the high voltage Vk is applied to the cathode electrode 16, and the gap 50 is formed while measuring the luminance of the phosphor 28 (step S31).

In this case, since the resistance Rk is reduced, the level of the voltage applied between the cathode electrode 16 and the anode electrode 20 of the electron emitter 10A1 increases. Thus, electron emission and plasma generation between the cathode electrode 16 and the emitter section 14 are enhanced. Accordingly, the outer peripheral portion 42 of the cathode electrode 16 is peeled off from the emitter section 14 to form the gap 50.

The resistor Rk may be a variable resistor. Alternatively, a plurality of resistors Rk1, Rk2 may be connected in parallel, and switching between the resistors Rk1, Rk2 may be carried out using a switch or the like. For example, the resistor Rk1 has a resistance value of 200 kΩ, and the resistor Rk2 has a resistance value of 50 kΩ.

Figure 19B:
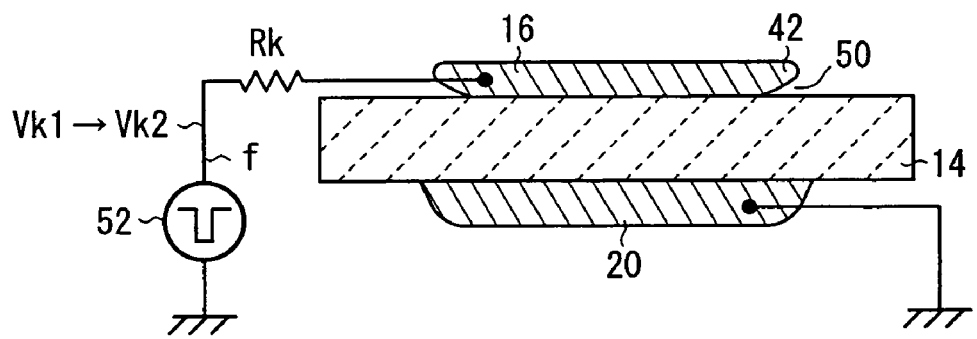
FIG. 19B is a view showing a second process in the first method.

In the second process, as shown in FIG. 19B, the high voltage Vk supplied from the pulse generation source 52 is increased from the high voltage Vk1 in the initial condition to the high voltage Vk2. At this time, the gap 50 is formed while measuring the luminance of the phosphor 28 (step S32).

In this case, since the voltage Vk is increased, the level of the voltage applied between the cathode electrode 16 and the anode electrode 20 of the electron emitter 10A1 increases. Thus, electron emission and plasma generation between the cathode electrode 16 and the emitter section 14 are enhanced. Accordingly, the outer peripheral portion 42 of the cathode electrode 16 is peeled off from the emitter section 14 to form the gap 50.

At this time, for example, the high voltage Vk is increased from Vk1=±100V to Vk2=±200V. For example, the voltage is changed by using a transformer which increase the voltage from Vk1 to Vk2.

Figure 19C:
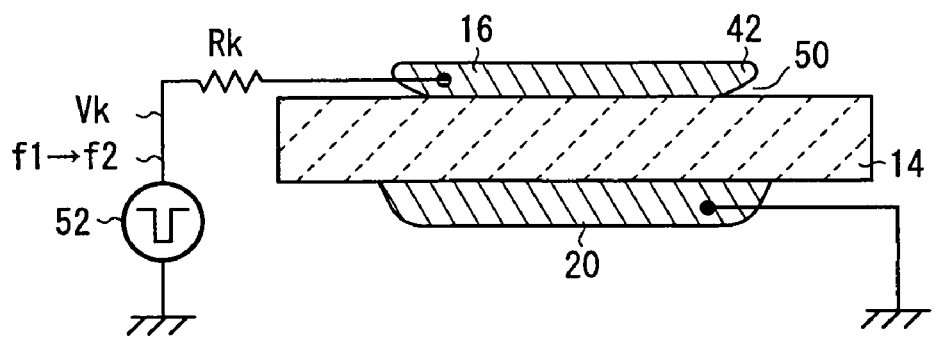
FIG. 19C is a view showing a third process in the first method.

In the third process, as shown in FIG. 19C, the frequency f of the high voltage Vk is changed from a frequency f1 in the initial condition to a frequency f2 which is higher than the frequency f1. In the condition, the high voltage Vk is applied to the cathode electrode 16, and the gap 50 is formed while measuring the luminance of the phosphor 28 (step S33).

In this case, since the frequency of the voltage Vk is changed to the frequency f2, electron emission and plasma generation between the cathode electrode 16 and the emitter section 14 are enhanced. Accordingly, the outer peripheral portion 42 of the cathode electrode 16 is peeled off from the emitter section 14 to form the gap 50.

At this time, for example, the frequency f of the high voltage pulse Vk is increased from f1=60 Hz to f2=840 Hz. For example, the frequency f is changed using an oscillator.

The luminance of the phosphor 28 is increased from the luminance in the initial condition by the formation of the gap 50. Therefore, the routine goes back to step S2 to determine whether the luminance is increased to reach the predetermined luminance or not. In step S2, if it is determined that the luminance reaches the predetermined luminance, the routine proceeds to step S4 to finish the operation of forming the gap 50, and brings the condition of the electron emitter 10A1 back to the initial condition. If it is determined that the luminance does not reach the predetermined luminance, the processes in steps S31 to S33 are repeated.

In the above-described first production method, the gap 50 is formed by peeling the outer peripheral portion 42 of the cathode electrode 16 from the surface of the emitter section 14. Alternatively, an outer peripheral portion of the anode electrode 20 may be peeled off from the surface of the emitter section 14 to form a gap at the anode electrode 20.

In the first production method, the luminance of the phosphor 28 depends on the number of electrons emitted from the emitter section 14 in the region (electron emission region) facing (near) the gap 50 of the electron emitter 10A1, or the electron emission efficiency of the electron emitter 10A1. That is, by measuring the luminance of the phosphor 28, it is possible to check the electron emission efficiency of the electron emitter 10A1. Therefore, it is not necessary to directly check the region around the gap 50 to determine the completeness of the gap 50. The gap 50 is formed by adjusting the voltage supplied to the cathode electrode 16 while measuring the luminance of the phosphor 28. In this manner, the electron emitter 10A1 having the desired electron emission efficiency is obtained.

Further, the above-described first production method is applicable, e.g., in a case in which luminance adjustment is carried out in the electron emitter 10A1 used as an electron emission source of a display. In this case, at the final inspection process before shipping from the factory, the operator of the final inspection can adjust the luminance of the phosphor 28 to achieve the desired luminance by applying the high voltage Vk to the cathode electrode 16 to form the gap 50. Thus, the luminance adjustment of the display before shipment can be carried out easily.

In another application, the method is carried out as a countermeasure to the decrease in the luminance after the display including the electron emitter 10A1 has been used for a long period of time. That is, using a maintenance device having a function to carry out the first production method, the maintenance operator carries out the first through third processes for adjusting the luminance of the display having the low luminance. The functions for carrying out the first through third processes may be incorporated in the display in advance. In this case, the user of the display can carry out the first through third processes at appropriate time when the luminance of the display is decreased.

In the second production method, the process of forming the gap 50 is included in the process of forming the cathode electrode 16 on the emitter section 14. The production method may be carried out using an etching method (first method) or a lift-off method (second method).

Figure 20A:
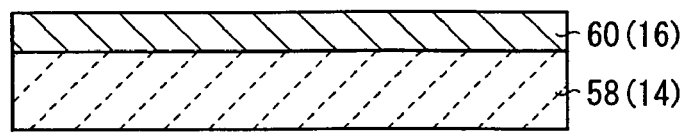
FIG. 20A is a view showing a process in the method (first method) of producing the electron emitter according to the first specific example.

In the first method, firstly, as shown in FIG. 20A, a platinum paste 60 serving as the cathode electrode 16 is formed on a surface of a dielectric substance 58 serving as the emitter section 14 using a know method such as screen printing.

Figure 20B:
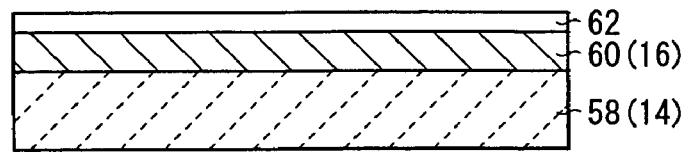
FIG. 20B is a view showing a process in the method (first method) of producing the electron emitter according to the first specific example.

Then, as shown in FIG. 20B, the platinum paste 60 is coated with photoresist 62 by spin coating such that the photoresist 62 is stretched on the platinum paste 60 like a thin film.

Figure 20C:
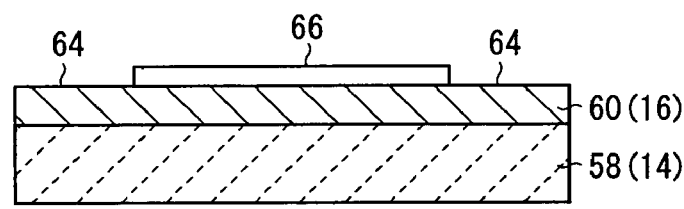
FIG. 20C is a view showing a process in the method (first method) of producing the electron emitter according to the first specific example.

Then, as shown in FIG. 20C, the photoresist 62 is exposed to light, and developed to form a photoresist pattern 66 for exposing part of the platinum paste 60 as an exposure region 64.

Figure 20D:
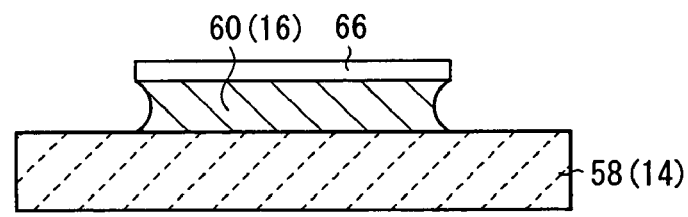
FIG. 20D is a view showing a process in the method (first method) of producing the electron emitter according to the first specific example.

Then, as shown in FIG. 20D, the exposure region 64 of the platinum paste 60 is removed by isotropic etching. Thus, the surface of the emitter section 14 is partially exposed. Further, a region of the platinum paste 60 just below the photoresist pattern 66, and near the exposure region 64 is also removed.

Figure 20E:
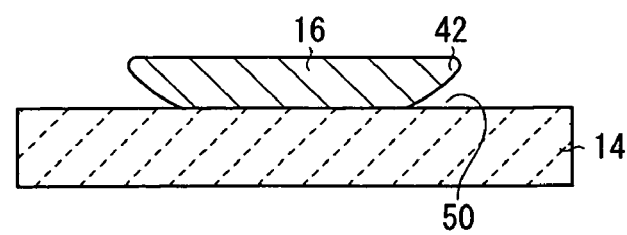
FIG. 20E is a view showing a process in the method (first method) of producing the electron emitter according to the first specific example.

Then, as shown in FIG. 20E, after the photoresist 62 is removed by ultrasonic cleaning using organic solution, the dielectric substance 58 serving as the emitter section 14 and the platinum paste 60 are fired to form an integral structure. In this manner, the electron emitter 10A1 having the emitter section 14 and the cathode electrode 16 is obtained. In this case, the platinum paste 60 is partially removed to form the outer peripheral portion 42, and the gap 50 is formed between the outer peripheral portion 42 and the emitter section 14.

Figure 21A:
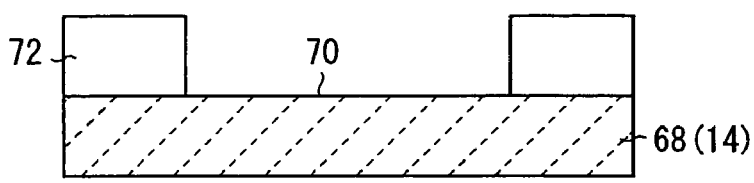
FIG. 21A is a view showing a process in a method (second method) of producing the electron emitter according to the first specific example.

In the second method, firstly, as shown in FIG. 21A, the surface of the dielectric substance 68 serving as the emitter section 14 is coated with photoresist 72 such that part of the surface of the dielectric substance 68 is exposed as an exposure region 70.

Figure 21B:
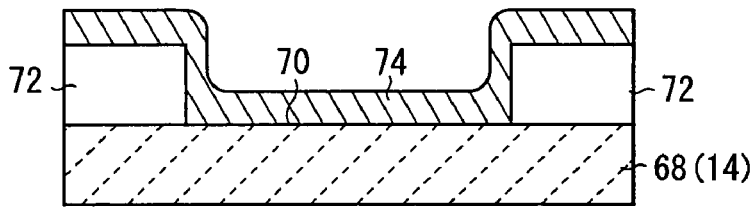
FIG. 21B is a view showing a process in the method (second method) of producing the electron emitter according to the first specific example.

Then, as shown in FIG. 21B, a platinum paste 74 is formed on the surface of the exposure region 70 and the surface of the photoresist 72.

Figure 21C:
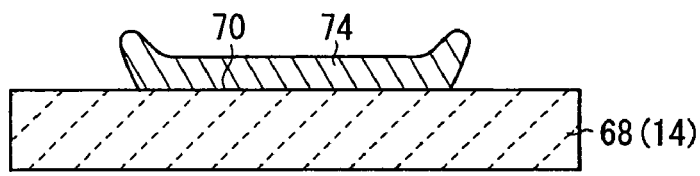
FIG. 21C is a view showing a process in a method (second method) of producing the electron emitter according to the first specific example.

Then, as shown in FIG. 21c, the photoresist 72 is removed by ultrasonic cleaning using organic solution. As a result, the platinum paste 74 on the photoresist 72 is removed, and the platinum paste 74 on the surface of the exposure region 70 is left.

Figure 21D:
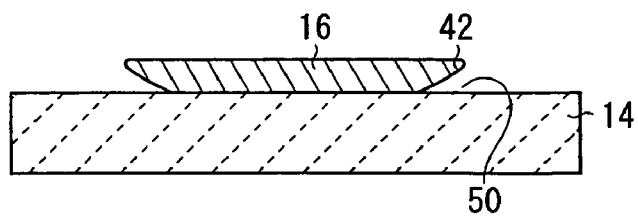
FIG. 21D is a view showing a process in a method (second method) of producing the electron emitter according to the first specific example.

Then, as shown in FIG. 21D, the dielectric substance 68 serving as the emitter section 14 and the platinum paste 74 are fired together to form an integral structure. In this manner, the electron emitter 10A1 having the emitter section 14 and the cathode electrode 16 is obtained. In this case, the outer peripheral portion of the platinum paste 74 is formed as the outer peripheral portion 42.

In the second production method, since the process of forming the gap 50 is included in the process of forming the cathode electrode 16, the gap 50 is produced simply. Further, the patterning process is used for forming the gap 50 accurately.

The emitter section 14 and the cathode electrode 16 are produced in the above-described second production method. It is a matter of course that the second production method is applicable to a method of forming the anode electrode 20 on the emitter section 14. It is possible to form the gap 50 between the emitter section 14 and the anode electrode 20.

Figure 22:
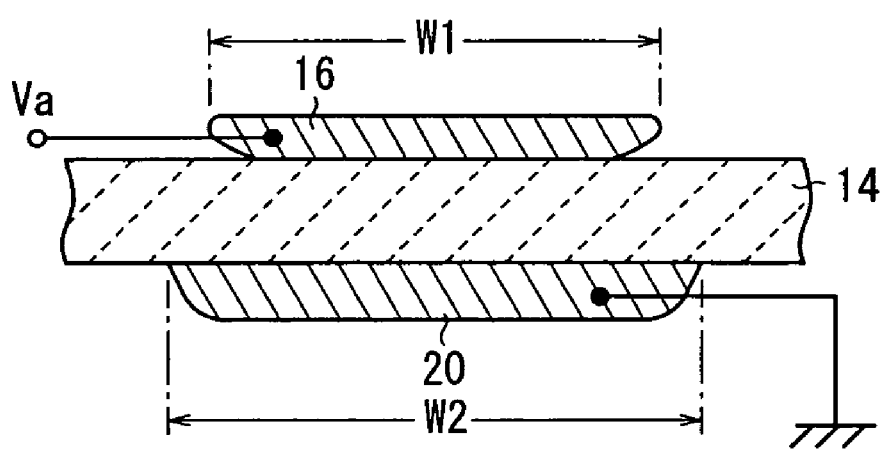
FIG. 22 is a view showing an electron emitter according to a second specific example.
Figure 23A:
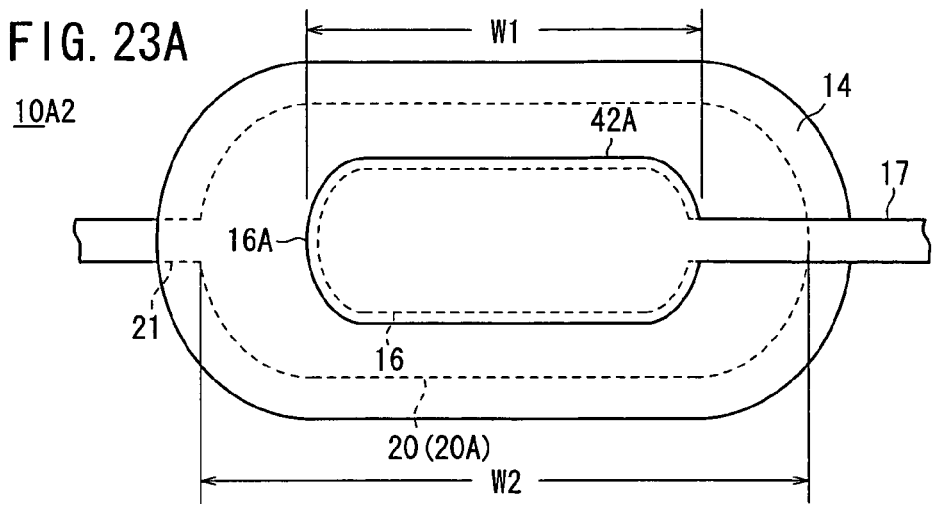
FIG. 23A is a plan view showing an example of the electron emitter according to the second specific example.

Next, an electron emitter 10A2 according to a second specific example will be explained. As shown in FIGS. 22, 23A, the structure of the electron emitter 10A2 according to the second specific example is similar to the structure of the electron emitter 10A according to the first embodiment, however, has a different in the following point. When a projection image 16A formed by projecting the cathode electrode 16 on the emitter section 14 is compared with a projection image 20A formed by projecting the anode electrode 20 on the emitter section 14, the projection image 20A of the anode electrode 20 is not within the projection image 16A of the cathode electrode 16, and protrudes from the projection image 16A of the cathode electrode 16.

Figure 23B:
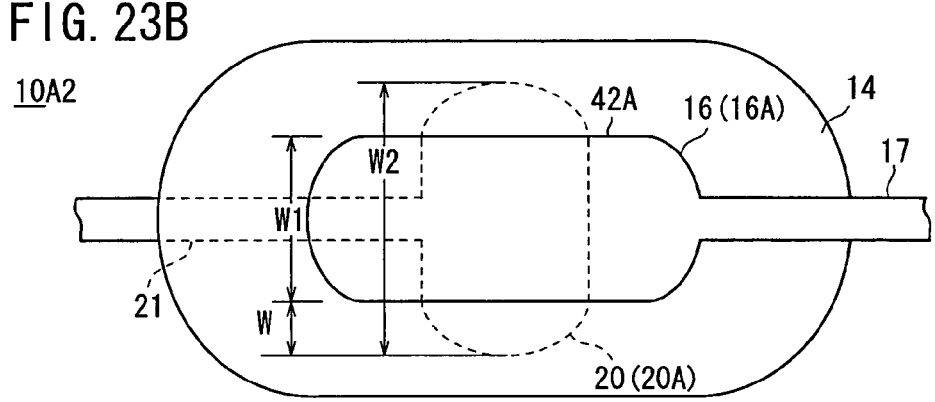
FIG. 23B is a plan view showing another example of the electron emitter according to the second specific example.

In this case, the projection image 20A of the anode electrode 20 may protrude totally from the outer peripheral portion 42A of the projection image 16A of the cathode electrode 16 as shown in FIG. 23A, or may protrude partially from the outer peripheral portion 42A of the projection image 16A of the cathode electrode 16 as shown in FIG. 23B.

Figure 23C:
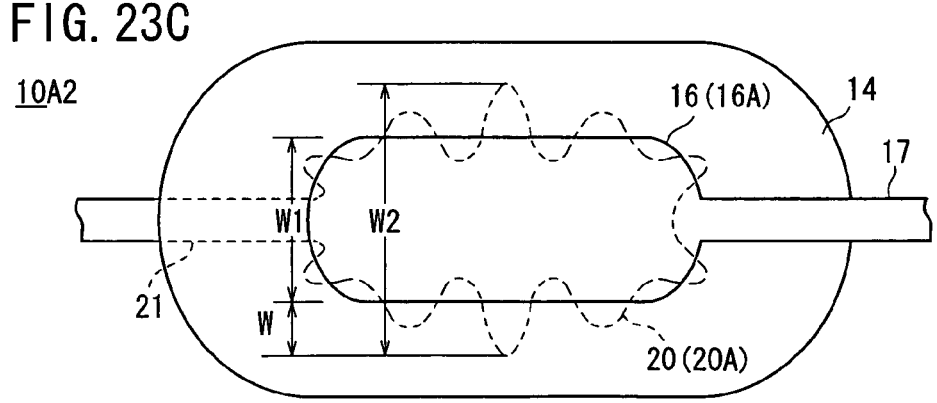
FIG. 23C is a plan view showing still another example of the electron emitter according to the second specific example.

Assuming that the projection image 20A of the anode electrode 20 partially or totally protrudes from the projection image 16A of the cathode electrode 16, based on the width W1 of the projection image 16A of the cathode electrode 16 in the orientation of the protrusion of the anode electrode 20 and the width W2 of the projection image 20A of the anode electrode 20 in the orientation of the protrusion of the anode electrode 20, the degree of protrusion of the projection image 20A of the anode electrode 20 from the projection image 16A of the cathode electrode 16 is defined as the protrusion amount W(=(W2−W1)/2). Preferably, the protrusion amount W is in the rage of 1 to 500 μm (W=1 to 500). As shown in FIG. 23C, if the projection image 20A of the anode electrode 20 protrudes from the protrusion image 16A of the cathode electrode 16 at many points, the protrusion amount W of the projection image 20A of the anode electrode 20 is determined based on the orientation of the largest protrusion.

Figure 24A:
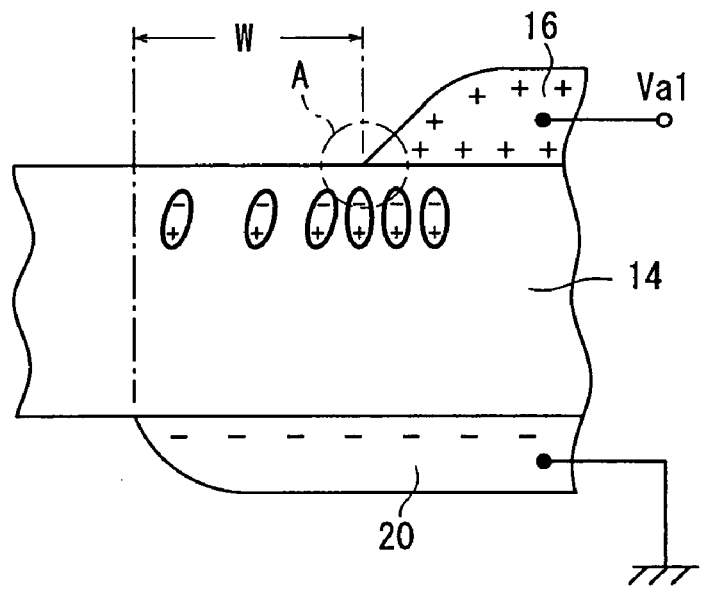
FIG. 24A is a view showing polarization in the emitter section of the electron emitter in FIG. 22.
Figure 24B:
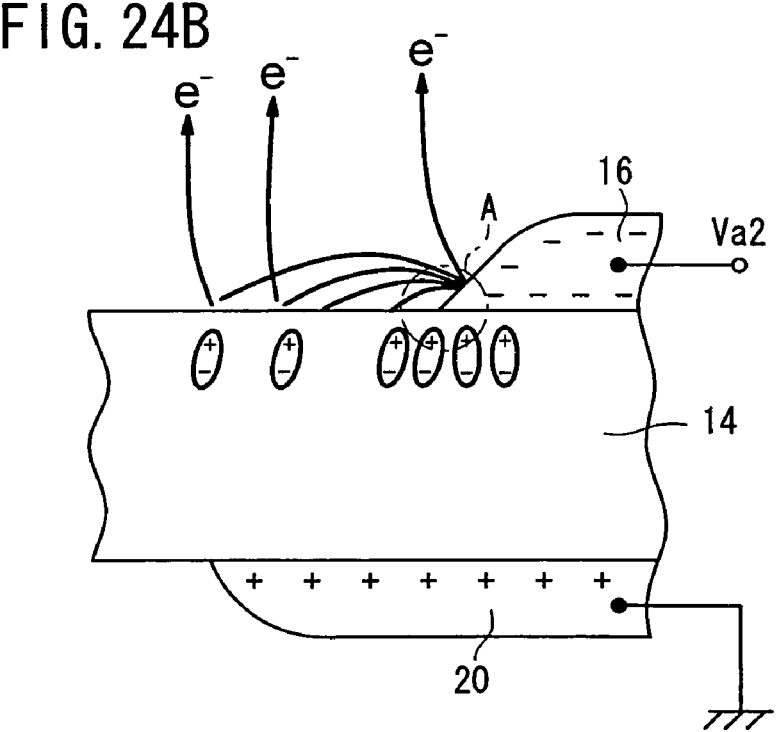
FIG. 24B is a view showing polarization reversal in the emitter section and electron emission of the electron emitter in FIG. 22.

In FIGS. 23B and 23C, the cathode electrode 16 is formed in contact with the emitter section 14, and the shape of the cathode electrode 16 matches the shape of the projection image 16A in the drawings. The anode electrode 20 is formed in contact with the emitter section 14, and the shape of the anode electrode 20 matches the shape of the projection image 20A in the drawings In the electron emitter 10A2, since the anode electrode 20 is formed to protrude from the cathode electrode 16, as shown in FIGS. 24A and 24B, in the region of the emitter section 14 which is not covered by the cathode electrode 16, polarization (FIG. 24A) and polarization reversal (FIG. 24B) occur easily. Thus, when the polarization reversal occurs as shown in FIG. 24B, electrons are easily emitted from the triple junction A of the cathode electrode 16 where the electric field is concentrated. Accordingly, it is possible to improve the electron emission efficiency of the electron emitter 10A2.

If the protrusion amount W is less than 1 μm, since the area for electron emission in the emitter section 14 is small, the advantages of the polarization and polarization reversal may not achieved. If the protrusion amount W is more than 500 μm, the number of regions which are not affected by the electric field concentration by the triple junction A is increased in the emitter section 14. Therefore, the electron emission efficiency of the electron emitter 10A2 is decreased.

Next, an electron emitter 10B according to a second embodiment will be described.

Figure 25:
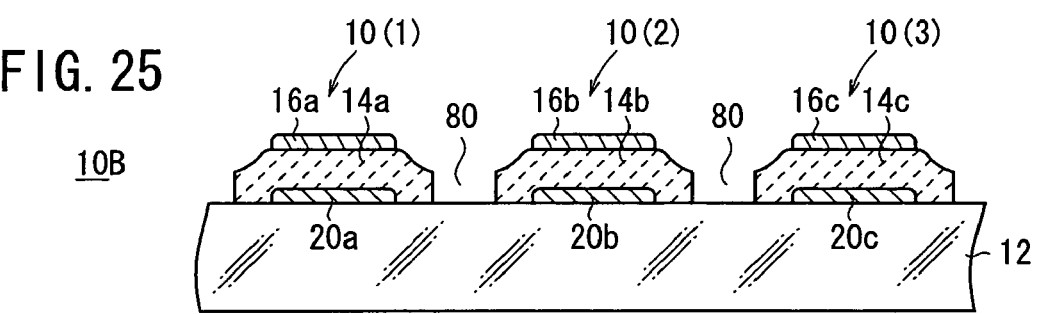
FIG. 25 is a view showing an electron emitter in FIG. 22.

The structure of the electron emitter 10B according to the second embodiment is substantially similar to the structure of the electron emitter 10A according to the first embodiment, however, differs in that a plurality of electron emitters 10(1), 10(2), 10(3) are formed on one substrate 12 as shown in FIG. 25.

That is, in the electron emitter 10B, anode electrodes 20a, 20b, 20c are independently formed on a surface of one substrate 12. Emitter sections 14a, 14b, 14c are formed on upper surfaces of the anode electrodes 20a, 20b, 20c, respectively. Further, cathode electrodes 16a, 16b, 16c are formed on the emitter sections 14a, 14b, 14c, respectively. The emitter sections 14a, 14b, 14c are interposed between the anode electrodes 20a, 20b, 20c, and the cathode electrodes 16a, 16b, 16c, respectively. Slits 80 are formed between the electron emitter 10(1) and the electron emitter 10(2), and between the electron emitter 10(2) and the electron emitter 10(3).

Next, a method of producing the electron emitter 10B will be described. For example, the electrode emitter 10B is produced by an etching process.

Figure 26A:
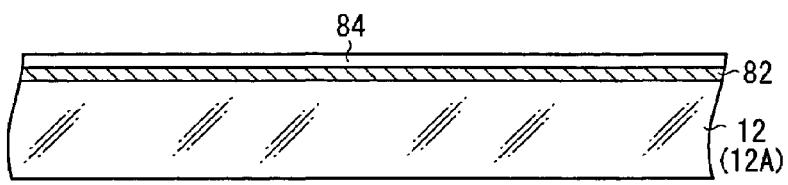
FIG. 26A is a view (No. 1) showing a process in a method of producing the electron emitter according to a second embodiment.

Firstly, as shown in FIG. 26A, a platinum paste 82 is formed on a material (e.g., glass plate) 12A serving as the substrate 12, for example, by screen printing. Then, the platinum paste 82 is coated with photoresist 84.

Figure 26B:
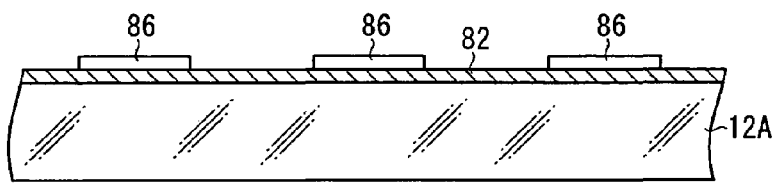
FIG. 26B is a view (No. 1) showing a process in the method of producing the electron emitter according to the second embodiment.

Then, as shown in FIG. 26B, a mask pattern is projected, and developed on the photoresist 84 to form a predetermined photoresist pattern 86.

Figure 26C:
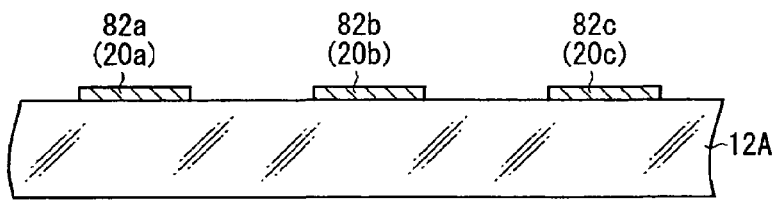
FIG. 26C is a view (No. 1) showing a process in the method of producing the electron emitter according to the second embodiment.

Then, as shown in FIG. 26C, part of the platinum paste 82 which is not covered by the photoresist pattern 86 is removed by etching. Then, the photoresist pattern 86 is removed by ultrasonic cleaning using organic solution. In this manner, the platinum pastes 82a, 82b, 82c serving as the anode electrodes 20a, 20b, 20c are formed.

Figure 26D:
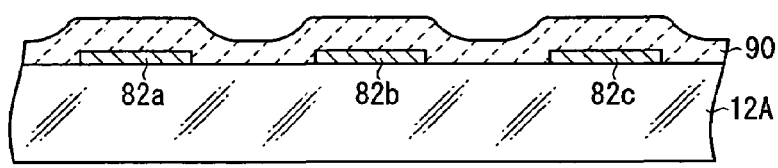
FIG. 26D is a view (No. 1) showing a process in the method of producing the electron emitter according to the second embodiment.

Then, as shown in FIG. 26D, a dielectric substance 90 is formed on the material 12A such that the dielectric substance 90 covers the platinum pastes 82a, 82b, 82c.

Figure 26E:
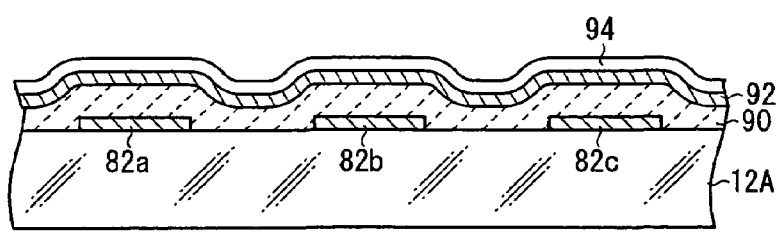
FIG. 26E is a view (No. 1) showing a process in the method of producing the electron emitter according to the second embodiment.

Then, as shown in FIG. 26E, a platinum paste 92 is formed on the dielectric substance 90, for example by screen printing. Then, the platinum paste 92 is coated with photoresist 94.

Figure 27A:
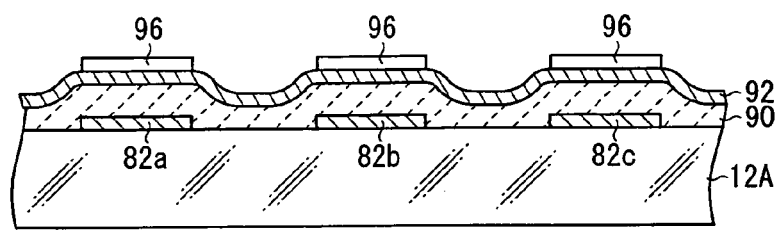
FIG. 27A is a view (No. 2) showing a process in the method of producing the electron emitter according to a second embodiment.

Then, as shown in FIG. 27A, a mask pattern is projected, and developed on the photoresist 94 to form a predetermined photoresist pattern 96.

Figure 27B:
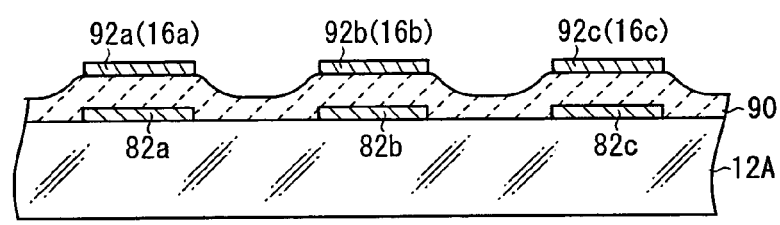
FIG. 27B is a view (No. 2) showing a process in the method of producing the electron emitter according to a second embodiment.

Then, as shown in FIG. 27B, part of the platinum paste 92 which is not covered by the photoresist pattern 96 is removed by etching. Then, the photoresist pattern 96 is removed by ultrasonic cleaning using organic solution. In this manner, the platinum pastes 92a, 92b, 92c serving as the cathode electrodes 16a, 16b, 16c are formed.

Figure 27C:
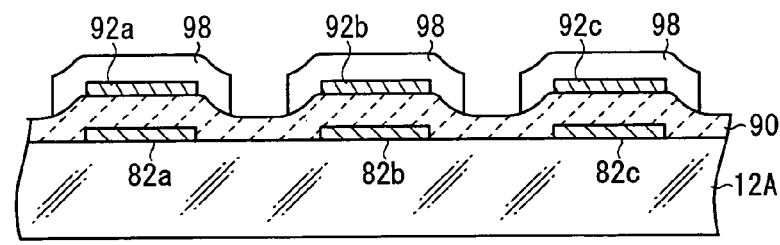
FIG. 27C is a view (No. 2) showing a process in the method of producing the electron emitter according to a second embodiment.

Then, as shown in FIG. 27C, the platinum pastes 92a, 92b, 92c and the dielectric substance 90 are coated with photoresist, and a mask pattern is projected on the photo resist. In this manner, a photoresist pattern 98 for exposing the surface of the dielectric substance 90 between the platinum pastes 92a, 92b, 92c is formed. In this case, the photoresist pattern 98 covers each of the platinum pastes 92a, 92b, 92c.

Figure 27D:
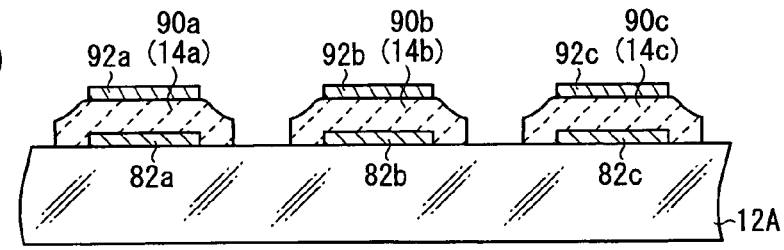
FIG. 27D is a view (No. 2) showing a process in the method of producing the electron emitter according to a second embodiment.

Then, as shown in FIG. 27D, part of the exposed dielectric substance 90 is removed by etching to form dielectric substances 90a, 90b, 90c serving as the emitter sections 14a, 14b, 14c. Then, the photoresist pattern 98 is removed by ultrasonic cleaning using organic solution. In this manner, the slits 80 are formed between the dielectric substances 90a, 90b, 90c.

Then, the material 12A, the dielectric substances 90a, 90b, 90c, and the platinum pastes 82a, 82b, 82c, 92a, 92b, 92c shown in FIG. 27D, are fired together to form an integral structure. In this manner, the electron emitter 10B as shown in FIG. 25 is formed.

In the production method, the slits 80 are formed between the electron emitter 10(1) and the electron emitter 10(2) and between the electron emitter 10(2) and the electron emitter 10(3). In this arrangement, electrostatic coupling exists between the electron emitter 10(1) and the electron emitter 10(2) and between the electron emitter 10(2) and the electron emitter 10(3). Further, the dielectric substance 90 serving as the emitter section 14 having high dielectric constant is partially removed to form the slits 80 as the vacuum space to reduce the electrostatic coupling significantly. Thus, crosstalk between the electron emitter 10(1) and the electron emitter 10(2) and between the electron emitter 10(2) and the electron emitter 10(3) is eliminated. Further, since the plurality of electron emitters 10(1), 10(2), 10(3) are formed on one substrate 12, for example, these electron emitters 10(1), 10(2), 10(3) are suitably used as pixel elements of a display having a large screen.

Then, the material of the substrate 12 will be described. The substrate 12 should preferably be made of an electrically insulative material in consideration of the electrical circuit requirements. Thus, the substrate 12 may be made of glass, a highly heat-resistant metal or a material such as an enameled metal whose surface is coated with a ceramic material such as glass or the like. However, the substrate 12 should preferably be made of ceramics.

Ceramics used for the substrate 12 include stabilized zirconium oxide, aluminum oxide, magnesium oxide, titanium oxide, spinel, mullite, aluminum nitride, silicon nitride, glass, or a mixture thereof. Of these ceramics, aluminum oxide or stabilized zirconium oxide is preferable from the standpoint of strength and rigidity. Stabilized zirconium oxide is particularly preferable because its mechanical strength is relatively high, its tenacity is relatively high, and its chemical reaction with the cathode electrode 16 and the anode electrode 20 is relatively small. Stabilized zirconium oxide includes stabilized zirconium oxide and partially stabilized zirconium oxide. Stabilized zirconium oxide does not develop a phase transition as it has a crystalline structure such as a cubic system.

Zirconium oxide develops a phase transition between a monoclinic system and a tetragonal system at about 1000° C. and is liable to suffer cracking upon such a phase transition. Stabilized zirconium oxide contains 1 to 30 mol % of a stabilizer such as calcium oxide, magnesium oxide, yttrium oxide, scandium oxide, ytterbium oxide, cerium oxide, or an oxide of a rare earth metal. For increasing the mechanical strength of the substrate 12, the stabilizer should preferably contain yttrium oxide. The stabilizer should preferably contain 1.5 to 6 mol % of yttrium oxide, or more preferably 2 to 4 mol % of yttrium oxide, and furthermore should preferably contain 0.1 to 5 mol % of aluminum oxide.

The crystalline phase may be a mixed phase of a cubic system and a monoclinic system, a mixed phase of a tetragonal system and a monoclinic system, a mixed phase of a cubic system, a tetragonal system, and a monoclinic system, or the like. The main crystalline phase which is a tetragonal system or a mixed phase of a tetragonal system and a cubic system is optimum from the standpoints of strength, tenacity, and durability.

If the substrate 12 is made of ceramics, then the substrate 12 is made up of a relatively large number of crystalline particles. For increasing the mechanical strength of the substrate 12, the crystalline particles should preferably have an average particle diameter ranging from 0.05 to 2 μm, or more preferably from 0.1 to 1 μm.

The emitter section 14 may be formed on the substrate 12 by any of various thick-film forming processes including screen printing, dipping, coating, electrophoresis, etc., or any of various thin-film forming processes including an ion beam process, sputtering, vacuum evaporation, ion plating, chemical vapor deposition (CVD), plating, etc.

As the firing process of the electron emitter 10B, for example, the material of the emitter section 14, the material of the cathode electrode 16, and the material of the anode electrode 20 may successively be stacked, and then fired into an integral structure as the electron emitter 10B. Alternatively, each time the emitter section 14, the cathode electrode 16, or the anode electrode 20 is formed, the assembly may be heated (fired) into a structure integral with the substrate 12. Depending on how the cathode electrode 16 and the anode electrode 20 are formed, however, the heating (firing) process for producing an integral structure may not be required.

The firing process for integrally combining the substrate 12, the emitter section 14, the cathode electrode 16, and the anode electrode 20 may be carried out at a temperature ranging from 500° to 1400° C., preferably from 1000° to 1400° C. For heating the emitter section 14 which is in the form of a film, the emitter section 14 should be fired together with its evaporation source while their atmosphere is being controlled so that the emitter section 14 does not have an unstable composition due to the high temperature.

The emitter section 14 may be covered with an appropriate member for preventing the surface of the emitter section 14 from being directly exposed to the firing atmosphere when the emitter section 14 is fired. The covering member should preferably be made of the same material as the substrate 12.

Figure 28:
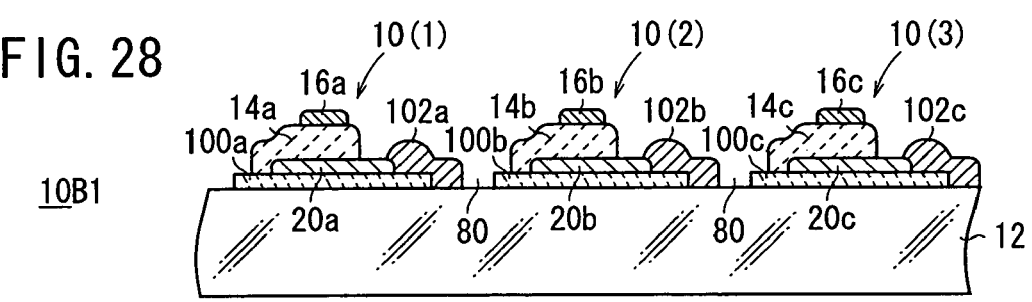
FIG. 28 is a view showing a modification of the electron emitter according to the second embodiment.

Next, in the electron emitter 10B1 according to a modified example of the second embodiment, as shown in FIG. 28, dielectric substances 100a, 100b, 100c are formed on the substrate 12. The anode electrodes 20a, 20b, 20c are formed on surfaces of the dielectric substances 100a, 100b, 100c respectively.

Then, emitter sections 14a, 14b, 14c are formed on surfaces of the anode electrodes 20a, 20b, 20c and the dielectric substances 100a, 100b, 100c such that the anode electrodes 20a, 20b, 20c are partially exposed. Further, the cathode electrodes 16a, 16b, 16c are formed on surfaces of the emitter sections 14a, 14b, 14c, respectively.

Thus, three electron emitters 10(1), 10(2), 10(3) having the emitter sections 14a, 14b, 14c, the cathode electrodes 16a, 16b, 16c, and the anode electrodes 20a, 20b, 20c are formed on the substrate 12. In this arrangement, the slits 80 are formed between the electron emitters 10(1), the electron emitter 10(2), and the electron emitter 10(3). The substrate 12 is exposed through the slits 80. Wiring patterns 102a, 102b, 102c are formed at the slits 80. The exposed portions of the anode electrodes 20a, 20b, 20c are connected to the wiring patterns 102a, 102b, 102c. In this arrangement, it is preferable that the dielectric substances 100a, 100b, 100c and the emitter sections 14a, 14b, 14c are made of the same dielectric material.

Figure 29A:
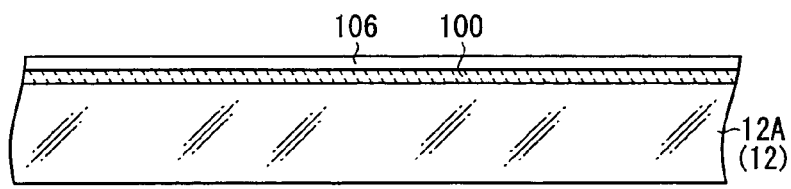
FIG. 29A is a view showing a process in the method of producing the electron emitter according to the second embodiment.

In producing the electron emitter 10B1, firstly, as shown in FIG. 29A, a dielectric substance 100 serving as the dielectric substances 100a, 100b, 100c is formed on the material (e.g., glass plate) 12A serving as the substrate 12. Then, the dielectric substance 100 is coated with photoresist 106.

Figure 29B:
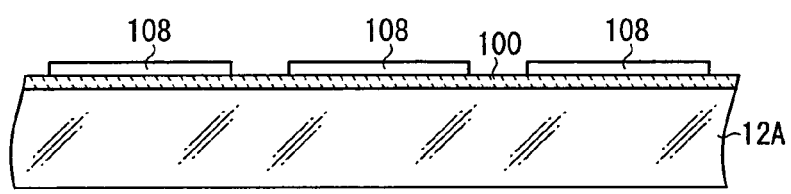
FIG. 29B is a view showing a process in the method of producing the electron emitter according to the second embodiment.

Then, as shown in FIG. 29B, a mask pattern is projected, and developed on the photoresist 106 to form a photoresist pattern 108 such that part of the dielectric substance 100 is exposed.

Figure 29C:
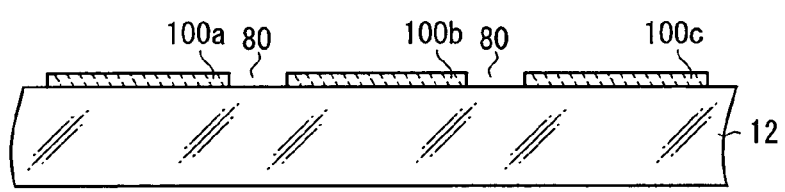
FIG. 29C is a view showing a process in the method of producing the electron emitter according to the second embodiment.

Then, as shown in FIG. 29C, after the etching process, the exposed portion of the dielectric substance 100 is removed from the surface of the material 12A by ultrasonic cleaning using organic solution. Further, by firing the material 12A and the remaining portion of the dielectric substance 100, the substrate 12 and the dielectric substances 100a, 100b, 100c are formed. Further, the slits 80 are formed between the dielectric substances 100a, 100b, 100c.

Figure 29D:
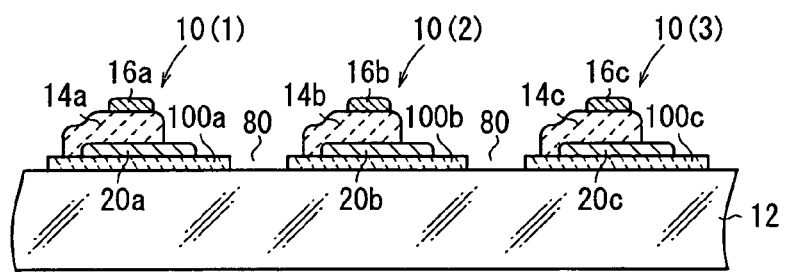
FIG. 29D is a view showing a process in the method of producing the electron emitter according to the second embodiment.

Then, as shown in FIG. 29D, the electron emitters 10(1), 10(2), 10(3), which have been produced separately in advance, are placed on the dielectric substances 100a, 100b, 100c, respectively. For example, the electron emitters 10(1), 10(2), 10(3) are adhered on the dielectric substances 100a, 100b, 100c by a thermal process (firing process). At this time, part of the lower surfaces of the emitter sections 14a, 14b, 14c, and the lower surfaces of the anode electrodes 20a, 20b, 20c are in contact with the upper surfaces of the dielectric substances 100a, 100b, 100c. Therefore, the electron emitters 10(1), 10(2), 10(3) are produced, for example using the production method of the electron emitter 10A1 according to the first specific example as shown in FIGS. 20 and 21.

Then, the wiring patterns 102a, 102b, 102c are formed on the substrate 12. The wiring patterns 102a, 102b, 102c are connected to the exposed portion of the anode electrodes 20a, 20b, 20c to obtain the electron emitter 10B1 as shown in FIG. 28.

In the electron emitter 10B1, the previously produced electron emitters 10(1), 10(2), 10(3) are formed on the substrate 12 through the dielectric substances 100a, 100b, 100c. The electron emitter 10B1 is also suitable as a pixel component of a display having a large screen.

Next, an electron emitter 10C according to a third embodiment will be described with reference to FIG. 30.

Figure 30:
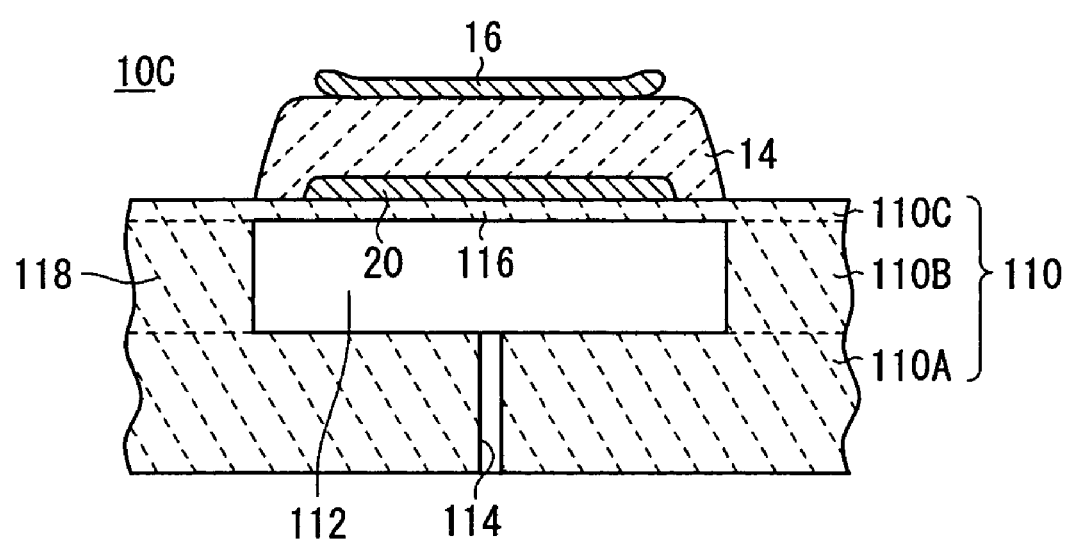
FIG. 30 is a view showing the electron emitter according to the third embodiment.
Figure 31:
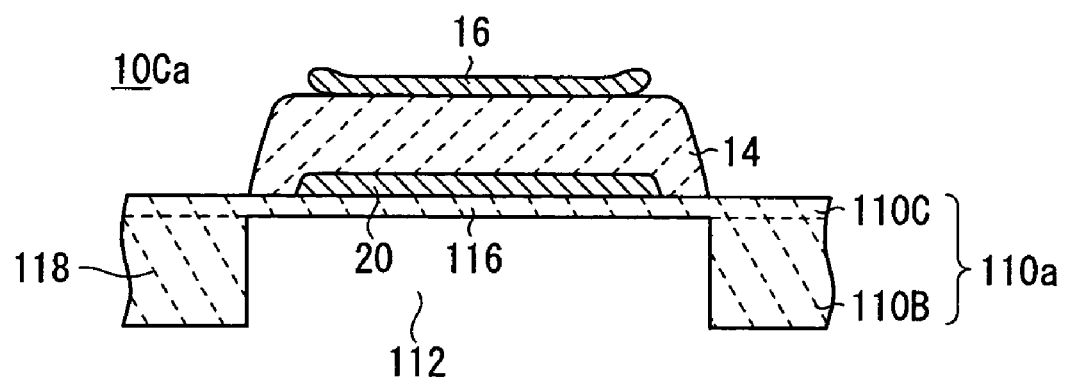
FIG. 31 is a view showing a modification of the electron emitter according to the third embodiment.

As shown in FIG. 30, the structure of the electron emitter 10C according to the third embodiment 10C is substantially similar to the structure of the electron emitter 10A according to the first embodiment, however, differs in that the electron emitter 10C has one substrate 110 made of, e.g., ceramics, the anode electrode 20 is formed on the surface of the substrate 110, the emitter section 14 is formed on the substrate 110 to cover the anode electrode 20, and the cathode electrode 16 is formed on the emitter section 14.

A space 112 is formed in the substrate 110 at a position for forming each emitter section 14. The space 112 forms a thin wall section as described later. The space 112 is connected to the outside through a small diameter through hole 114 provided on the other surface of the substrate 110.

The substrate 110 has a thin region where the space 112 is formed. The thin region is hereinafter referred to as the "thin wall section 116". The other region of the substrate 110 is thick, and functions as a support section 118 for supporting the thin wall section 116.

That is, the substrate 110 is a stack body formed by stacking a substrate layer 110A as a lowermost layer, a spacer layer 110B as an intermediate layer, and a thin plate layer 110C as an uppermost layer. The substrate 110 has an integral structure having the space 112 at the position corresponding to the emitter section 14. The substrate layer 110A functions as a reinforcing substrate. Further, a wiring pattern is formed on the substrate layer 110A. The substrate 110 may be formed by firing the substrate layer 110A, the spacer layer 110B, and the thin plate layer 110C to form an integral structure. Alternatively, the substrate 110 may be formed by connecting the substrate layer 110A, the spacer layer 110B, and the thin plate layer 110C by bonding.

Preferably, the thin wall section 116 is made of highly heat resistant material. Because, if material having poor heat resistance such as organic adhesive is not used for the emitter section 14, and the thin wall section 116 is supported directly by the support section 118, it is necessary to prevent the change in properties of the thin wall section 116. Thus, it is preferable that the thin wall section 116 is made of a highly heat resistant material.

Further, preferably, the thin wall section 116 is made of an electrically insulative material for electrically separating the wiring connected to the cathode electrode 16 and the wiring connected to the anode electrode 20 formed on the substrate 110.

Thus, the thin wall section 116 may be made of a highly heat-resistant metal or a metal material such as an enameled metal whose surface is coated with a ceramic material such as glass or the like. Most preferably, the thin wall section 116 is made of ceramics.

Ceramics used for the thin wall section 116 may be substantially the same ceramics used for the substrate 12 of the electron emitter 10B according to the second embodiment. Therefore, description about the material of the thin wall section 116 will be omitted.

Preferably, the supporting section 118 is made of ceramics. The ceramics used for the supporting section 118 may be the same as the ceramics used for the thin wall section 116. The ceramics used for the supporting section 118 may be different from the ceramics used for the thin wall section 116. As with the material of the thin wall section 116, the ceramics used for the supporting section 118 include, for example, stabilized zirconium oxide, aluminum oxide, magnesium oxide, titanium oxide, spinel, mullite, aluminum nitride, silicon nitride, glass, or a mixture thereof.

It is preferable that the substrate 110 used in the electron emitter 10C is made of a material containing zirconium oxide as a chief component, a material containing aluminum oxide as a chief component, and a material containing a mixture of zirconium oxide and aluminum oxide as a chief component. Of these materials, the material including zirconium oxide is particularly preferable.

Clay or the like may be added as a sintering additive. Components of such a sintering additive need to be adjusted so that the sintering additive does not contain excessive amounts of materials which can easily be vitrified, e.g., silicon oxide, boron oxide, etc. This is because while these easily vitrifiable materials are advantageous in joining the substrate 110 to the emitter section 14, they promote a reaction between the substrate 110 and the emitter section 14, making it difficult to keep the desired composition of the emitter section 14 and resulting in a reduction in the device characteristics.

Specifically, the easily vitrifiable materials such as silicon oxide in the substrate 110 should preferably be limited to 3% by weight or less or more preferably to 1% by weight or less. The chief component referred to above is a component which is present at 50% by weight or more.

The thickness of the thin wall section 116 and the thickness of the emitter section 14 should preferably be of substantially the same level. If the thickness of the thinned portion 116 were extremely larger than the thickness of the emitter section 14 by ten times or more, since the thin wall section 116 would prevent the emitter section 14 from shrinking when it is fired, large stresses would be generated at the interface between the emitter section 14 and the substrate 110. Therefore, the emitter section 14 is easily peeled off from the substrate 110. If the thickness of the thin wall section 116 is substantially the same as the thickness of the emitter section 14, the substrate 110 (the thin wall section 116) is easy to follow the emitter section 14 as it shrinks when it is fired, allowing the substrate 110 and the emitter section 14 to be appropriately formed into an integral structure. Specifically, the thickness of the thin wall section 116 should preferably be in the range from 1 to 100 μm, more preferably in the range from 3 to 50 μm, and even more preferably in the range from 5 to 20 μm. The thickness of the emitter section 14 should preferably be in the range from 5 to 100 μm, more preferably in the range from 5 to 50 μm, and even more preferably in the range from 5 to 30 μm.

The emitter section 14 may be formed on the substrate 110 by any of various thick-film forming processes including screen printing, dipping, coating, electrophoresis, etc., or any of various thin-film forming processes including an ion beam process, sputtering, vacuum evaporation, ion plating, chemical vapor deposition (CVD), plating, etc.

As the firing process of the electron emitter 10C, for example, the material serving as the anode electrode 20, the material serving as the emitter section 14, the material serving as the cathode electrode 16 may successively be stacked on the substrate 110, and then fired into an integral structure as the electron emitter 10C. Alternatively, each time the anode electrode 20, the emitter section 14, or the cathode electrode 16 is formed, the assembly may be heated (fired) into a structure integral with the substrate 110. Depending on how the cathode electrode 16 and the anode electrode 20 are formed, however, the heating (firing) process for producing an integral structure may not be required.

The firing process for integrally combining the substrate 110, the emitter section 14, the cathode electrode 16, and the anode electrode 20 may be carried out at a temperature ranging from 500° to 1400° C., preferably from 1000° to 1400° C. For heating the emitter section 14 which is in the form of a film, the emitter section 14 should be fired together with its evaporation source while their atmosphere is being controlled so that the emitter section 14 does not have an unstable composition due to the high temperature.

The emitter section 14 may be covered with an appropriate member for preventing the surface of the emitter section 14 from being directly exposed to the firing atmosphere when the emitter section 14 is fired. The covering member should preferably be made of the same material as the substrate 110.

In the electron emitter 10C according to the third embodiment, the emitter section 14 is contracted at the time of firing. The stress generated at the time of contraction is released by deformation of the space 112 or the like. Thus, the emitter section 14 can be densified sufficiently. Since the emitter section 14 is densified desirably, the withstand voltage is improved, and the polarization reversal and polarization change in the emitter section 14 are carried out efficiently, and characteristics of the electron emitter 10C are improved.

In the third embodiment, the substrate 110 has a three-layer structure. Alternatively, in an electron emitter 10Ca according to a modified example shown in FIG. 31, a substrate 110a having a two-layer structure without the lowermost layer 110A is used.

In the electron emitters 10A through 10C according to the first through third embodiments (including the modifications), the collector electrode 24 may be coated with the phosphor 28 as shown in FIGS. 1 and 25 for use as a pixel of a display. The displays of the electron emitters 10A through 10C offer the following advantages:

(1) The displays are thin (the panel thickness=several mm) in comparison with CRTs.

(2) Since the displays emit natural light from the phosphor 28, they can provide a wide angle of view which is about 180° unlike LCDs (liquid crystal displays) and LEDs (light-emitting diodes).

(3) Since the displays employ a surface electron source, they produce less image distortions than CRTs.

(4) The displays can respond more quickly than LCDs, and can display moving images free of after image with a high-speed response on the order of μsec.

(5) The displays consume an electric power of about 100 W in terms of a 40-inch size, and hence is characterized by lower power consumption than CRTs, PDPs (plasma displays), LCDs, and LEDs.

(6) The displays have a wider operating temperature range (−40° to +85° C.) than PDPs and LCDs. LCDs have lower response speeds at lower temperatures.

(7) The displays can produce higher luminance than conventional FED displays as the phosphor can be excited by a large current output.

(8) The displays can be driven at a lower voltage than conventional FED displays because the drive voltage can be controlled by the polarization reversing characteristics (or polarization changing characteristics) and film thickness of the piezoelectric material.

Because of the above various advantages, the displays can be used in a variety of applications described below.

(1) Since the displays can produce higher luminance and consume lower electric power, they are optimum for use as 30- through 60-inch displays for home use (television and home theaters) and public use (waiting rooms, karaoke rooms, etc.).

(2) Inasmuch as the displays can produce higher luminance, can provide large screen sizes, can display full-color images, and can display high-definition images, they are optimum for use as horizontally or vertically long, specially shaped displays, displays in exhibitions, and message boards for information guides.

(3) Because the displays can provide a wider angle of view due to higher luminance and phosphor excitation, and can be operated in a wider operating temperature range due to vacuum modularization thereof, they are optimum for use as displays on vehicles. Displays for use on vehicles need to have a horizontally long 8-inch size whose horizontal and vertical lengths have a ratio of 15:9 (pixel pitch=0.14 mm), an operating temperature in the range from −30° to +85° C., and a luminance level ranging from 500 to 600 cd/m$^2$ in an oblique direction.

Because of the above various advantages, the electron emitters can be used as a variety of light sources described below.

(1) Since the electron emitters can produce higher luminance and consume lower electric power, they are optimum for use as projector light sources which are required to have a luminance level of 200 lumens.

(2) Because the electron emitters can easily provide a high-luminance two-dimensional array light source, can be operated in a wide temperature range, and have their light emission efficiency unchanged in outdoor environments, they are promising as an alternative to LEDs. For example, the electron emitters are optimum as an alternative to two-dimensional array LED modules for traffic signal devices. At 25° C. or higher, LEDs have an allowable current lowered and produce low luminance.

The electron emitter according to the present invention are not limited to the above embodiments, but may be embodied in various arrangement without departing from the scope of the present invention.

What is claimed is:

1. An electron emitter comprising:
a substance comprising a dielectric material serving as an emitter;
a first electrode formed in contact with a first surface of said substance serving as the emitter; and
a second electrode formed in contact with a second surface of said substance serving as the emitter,
wherein a gap is formed at least between an outer peripheral portion of said first electrode and said first surface of said substance serving as the emitter;
a base end is formed by contact between said first surface of said substance serving as the emitter and a lower surface of said outer peripheral portion facing said first surface; and
when a drive voltage for inducing polarization reversal of said substance serving as the emitter is applied between said first electrode and said second electrode, electric field concentration occurs at a tip end of said outer peripheral portion and said base end for emitting electrons.

2. An electron emitter according to claim 1, wherein said tip end of said outer peripheral portion has an acute shape.

3. An electron emitter according to claim 1, wherein an angle defined by contact between said first surface of said substance serving as the emitter and said lower surface of said outer peripheral portion is not greater than 90°.

4. An electron emitter according to claim 1, wherein at least said first electrode comprises cermet.

5. An electron emitter according to claim 4, wherein said cermet includes gold, platinum, or silver, and a piezoelectro/electrostrictive material.

6. An electron emitter according to claim 5, said piezoelectro/electrostrictive material has a proportion ranging from 10 to 40 volume %.

7. An electron emitter according to claim 1, wherein at least said first electrode comprises metal oxide for reducing fatigue due to polarization reversal of said substance serving as the emitter which occurs when the drive voltage is applied between said first electrode and said second electrode.

8. An electron emitter according to claim 7, wherein said metal oxide of said first electrode comprises $RuO_2$, $IrO_2$, $SrRuO_3$, or $La_{1-x}Sr_xCoO_3$.

9. An electron emitter according to claim 1, wherein said substance serving as the emitter comprises a dielectric material having a high melting point.

10. An electron emitter according to claim 9, wherein said dielectric material is a material which does not include Pb.

11. An electron emitter according to claim 10, wherein said material which does not include Pb is $BaTiO_3$ or $Ba_{1-x}Sr_xTiO_3$.

12. An electron emitter according to claim 1, wherein said substance serving as the emitter comprises a material for reducing fatigue due to polarization reversal of said substance serving as the emitter which occurs when the drive voltage is applied between said first electrode and said second electrode.

13. An electron emitter according to claim 12, wherein said material for reducing fatigue due to polarization reversal comprises strontium tantalate bismuthate.

14. An electron emitter according to claim 1, wherein a plurality of said second electrodes are formed on an upper surface of a substrate;
a plurality of said substances serving as the emitters are formed on said upper surface of said substrate to cover said second electrodes;
a plurality of said first electrodes are formed on upper surfaces of said substances serving as the emitters at positions corresponding to said second electrodes, respectively; and
slits are formed between said substances serving as the emitters such that said upper surface of said substrate is exposed.

15. An electron emitter according to claim 1, wherein a plurality of dielectric substances are formed on an upper surface of a substrate;
a plurality of said second electrodes are formed on upper surfaces of said dielectric substances, respectively;
a plurality of said substances serving as the emitters are formed on upper surfaces of said second electrodes and upper surfaces of said dielectric substances;
a plurality of said first electrodes are formed on upper surfaces of said substances serving as the emitters at positions corresponding to said second electrodes, respectively;
wiring patterns are formed on said upper surface of said substrate; and
portions of said second electrodes are connected to said wiring patterns.

16. An electron emitter according to claim 1, wherein a third electrode is disposed above said substance serving as the emitter at a position facing at least said first electrodes, and a phosphor is formed on a surface of said third electrode.

17. An electron emitter comprising:
a substance comprising a dielectric material serving as an emitter;
a first electrode formed in contact with a first surface of said substance serving as the emitter; and
a second electrode formed in contact with a second surface of said substance serving as the emitter,
wherein when said first electrode is projected on said first surface, said second electrode is projected on said second surface, and a projection image of said first electrode and a projection image of said second electrode are compared with each other, the projection image of said second electrode protrudes from the projection image of said wherein an outer peripheral portion of the projection image of said second electrode protrudes from a tip end of an outer peripheral portion of the projection image of said first electrode by 1 to 500μ at most.

18. An electron emitter according to claim 17, wherein at least said first electrode comprises cermet.

19. An electron emitter according to claim 18, wherein said cermet includes gold, platinum, or silver, and a piezoelectro/electrostrictive material.

20. An electron emitter according to claim 19, said piezoelectro/electrostrictive material has a proportion ranging from 10 to 40 volume %.

21. An electron emitter according to claim 17, wherein at least said first electrode comprises metal oxide for reducing fatigue due to polarization reversal of said substance serving as the emitter which occurs when the drive voltage is applied between said first electrode and said second electrode.

22. An electron emitter according to claim 21, wherein said metal oxide of said first electrode comprises $RuO_2$, $IrO_2$, $SrRuO_3$, or $La_{1-x}Sr_xCoO_3$.

23. An electron emitter according to claim 17, wherein said substance serving as the emitter comprises a dielectric material having a high melting point.

24. An electron emitter according to claim 23, wherein said dielectric material is a material which does not include Pb.

25. An electron emitter according to claim 24, wherein said material which does not include Pb is $BaTiO_3$ or $Ba_{1-x}Sr_xTiO_3$.

26. An electron emitter according to claim 17, wherein said substance serving as the emitter comprises a material for reducing fatigue due to polarization reversal of said substance serving as the emitter which occurs when the drive voltage is applied between said first electrode and said second electrode.

27. An electron emitter according to claim 26, wherein said material for reducing fatigue due to polarization reversal comprises strontium tantalate bismuthate.

28. An electron emitter according to claim 17, wherein a plurality of said second electrodes are formed on an upper surface of a substrate;
a plurality of said substances serving as the emitters are formed on said upper surface of said substrate to cover said second electrodes;

a plurality of said first electrodes are formed on said upper surfaces of said substances serving as the emitters at positions corresponding to said second electrodes, respectively; and slits are formed between substances serving as the emitters such that said upper surface of said substrate is exposed.

29. An electron emitter according to claim 17, wherein a plurality of dielectric substances are formed on an upper surface of a substrate;

a plurality of said second electrodes are formed on upper surfaces of said dielectric substances, respectively;

a plurality of said substances serving as the emitters are formed on upper surfaces of said second electrodes and upper surfaces of said dielectric substances;

a plurality of said first electrodes are formed on upper surfaces of said substances serving as the emitters at positions corresponding to said second electrodes, respectively;

wiring patterns are formed on said upper surface of said substrate; and portions of said second electrodes are connected to said wiring patterns.

30. An electron emitter according to claim 17, wherein a third electrode is formed above said substances serving as emitters at a position facing at least said first electrodes, and a phosphor is formed on a surface of said third electrode.

* * * * *

UNITED STATES PATENT AND TRADEMARK OFFICE
CERTIFICATE OF CORRECTION

| | | |
|---|---|---|
| PATENT NO. | : 7,307,383 B2 | Page 1 of 1 |
| APPLICATION NO. | : 10/952524 | |
| DATED | : December 11, 2007 | |
| INVENTOR(S) | : Yukihisa Takeuchi, Tsutomu Nanataki and Iwao Ohwada | |

It is certified that error appears in the above-identified patent and that said Letters Patent is hereby corrected as shown below:

Title Page, item (56)
References Cited, *U.S. PATENT DOCUMENTS*: please add

--6,538,391   3/2003   Suzuki et al.
  2003/0141494   7/2003   Govyadinov et al.--

*FOREIGN PATENT DOCUMENTS*: please add

EP     1 463 022 A2   9/2004

Column 32
    *Line 20*: please add --first electrode,-- after "image of said" and make a new paragraph before "wherein"
    *Line 24*: please change "500$\mu$" to --500$\mu$m--

Signed and Sealed this

Ninth Day of September, 2008

JON W. DUDAS
*Director of the United States Patent and Trademark Office*